(12) United States Patent
Dalebout et al.

(10) Patent No.: US 11,673,036 B2
(45) Date of Patent: Jun. 13, 2023

(54) EXERCISE STORAGE SYSTEM

(71) Applicant: iFIT Inc., Logan, UT (US)

(72) Inventors: William T. Dalebout, North Logan, UT (US); Michael L. Olson, Providence, UT (US)

(73) Assignee: iFIT Inc., Logan, UT (US)

( * ) Notice: Subject to any disclaimer, the term of this patent is extended or adjusted under 35 U.S.C. 154(b) by 76 days.

(21) Appl. No.: 17/096,350

(22) Filed: Nov. 12, 2020

(65) Prior Publication Data

US 2021/0138332 A1 May 13, 2021

Related U.S. Application Data

(60) Provisional application No. 62/934,291, filed on Nov. 12, 2019, provisional application No. 62/934,297, filed on Nov. 12, 2019.

(51) Int. Cl.
*A63B 71/00* (2006.01)
*E05F 15/60* (2015.01)
(Continued)

(52) U.S. Cl.
CPC ........ *A63B 71/0036* (2013.01); *A47B 67/005* (2013.01); *A47G 1/02* (2013.01);
(Continued)

(58) Field of Classification Search
CPC ............ A63B 24/0006; A63B 24/0062; A63B 24/0075; A63B 2024/0009; A63B 2024/0012; A63B 2024/0015; A63B 2024/0018; A63B 2024/0065; A63B 2024/0068; A63B 2024/0071; A63B 2210/06; A63B 71/0036; A63B 71/0622; A63B 2225/12; A63B 2071/0658;
(Continued)

(56) References Cited

U.S. PATENT DOCUMENTS 3,123,646 A 3/1964 Easton
3,579,339 A 5/1971 Chang
(Continued)

FOREIGN PATENT DOCUMENTS

CN 101610715 12/2009
CN 107861512 3/2018
(Continued)

OTHER PUBLICATIONS

U.S. Appl. No. 13/088,007, filed Apr. 15, 2011, Scott R. Watterson.
(Continued)

*Primary Examiner* — Andrew M Roersma
(74) *Attorney, Agent, or Firm* — Ray Quinney & Nebeker P.C.; Paul N. Taylor

(57) ABSTRACT

An exercise storage system includes a storage compartment including at least one storage element. Exercise equipment is stored on the storage elements. A door is connected to the storage compartment with a hinge such that the viewing angle of the door is adjustable. A display on the door includes a backlit display and a mirrored display. A user may select exercise equipment from the storage compartment and perform an exercise activity while viewing the display.

20 Claims, 9 Drawing Sheets

(51) Int. Cl.
  *A47B 67/00* (2006.01)
  *A47G 1/02* (2006.01)
  *A63B 71/06* (2006.01)

(52) U.S. Cl.
  CPC .......... *A63B 71/0622* (2013.01); *E05F 15/60* (2015.01); *A47B 2220/0091* (2013.01); *A63B 2071/0638* (2013.01); *A63B 2225/12* (2013.01); *E05Y 2900/202* (2013.01)

(58) Field of Classification Search
  CPC .......... A63B 2071/065; A63B 21/0726; A63B 21/1645; G09B 19/003; G06V 40/23; E05Y 2900/202; A47G 1/02; E05F 15/60; A47B 46/00; A47B 67/005; A47B 81/00; A47B 2220/0091; A47B 2220/06
  See application file for complete search history.

(56) References Cited

U.S. PATENT DOCUMENTS

| | | |
|---|---|---|
| 4,023,795 A | 5/1977 | Pauls |
| 4,300,760 A | 11/1981 | Bobroff |
| D286,311 S | 10/1986 | Martinell |
| 4,681,318 A | 7/1987 | Lay |
| 4,684,126 A | 8/1987 | Dalebout |
| 4,728,102 A | 3/1988 | Pauls |
| 4,750,736 A | 6/1988 | Watterson |
| 4,796,881 A | 1/1989 | Watterson |
| 4,813,667 A | 3/1989 | Watterson |
| 4,830,371 A | 5/1989 | Lay |
| 4,844,451 A | 7/1989 | Bersonnet |
| 4,850,585 A | 7/1989 | Dalebout |
| D304,849 S | 11/1989 | Watterson |
| 4,880,225 A | 11/1989 | Lucas |
| 4,883,272 A | 11/1989 | Lay |
| D306,468 S | 3/1990 | Watterson |
| D306,891 S | 3/1990 | Watterson |
| 4,913,396 A | 4/1990 | Dalebout |
| D307,614 S | 5/1990 | Bingham |
| D307,615 S | 5/1990 | Bingham |
| 4,921,242 A | 5/1990 | Watterson |
| 4,932,650 A | 6/1990 | Bingham |
| D309,167 S | 7/1990 | Griffin |
| D309,485 S | 7/1990 | Bingham |
| 4,938,478 A | 7/1990 | Lay |
| D310,253 S | 8/1990 | Bersonnet |
| 4,955,599 A | 9/1990 | Bersonnet |
| 4,971,316 A | 11/1990 | Dalebout |
| D313,055 S | 12/1990 | Watterson |
| 4,974,832 A | 12/1990 | Dalebout |
| 4,979,737 A | 12/1990 | Kock |
| 4,981,294 A | 1/1991 | Dalebout |
| D315,765 S | 3/1991 | Measom |
| 4,998,725 A | 3/1991 | Watterson |
| 5,000,442 A | 3/1991 | Dalebout |
| 5,000,443 A | 3/1991 | Dalebout |
| 5,000,444 A | 3/1991 | Dalebout |
| D316,124 S | 4/1991 | Dalebout |
| 5,013,033 A | 5/1991 | Watterson |
| 5,014,980 A | 5/1991 | Bersonnet |
| 5,016,871 A | 5/1991 | Dalebout |
| D318,085 S | 7/1991 | Jacobson |
| D318,086 S | 7/1991 | Bingham |
| D318,699 S | 7/1991 | Jacobson |
| 5,029,801 A | 7/1991 | Dalebout |
| 5,034,576 A | 7/1991 | Dalebout |
| 5,058,881 A | 10/1991 | Measom |
| 5,058,882 A | 10/1991 | Dalebout |
| D321,388 S | 11/1991 | Dalebout |
| 5,062,626 A | 11/1991 | Dalebout |
| 5,062,627 A | 11/1991 | Bingham |
| 5,062,632 A | 11/1991 | Dalebout |
| 5,062,633 A | 11/1991 | Engel |
| 5,067,710 A | 11/1991 | Watterson |
| 5,072,929 A | 12/1991 | Peterson |
| D323,009 S | 1/1992 | Dalebout |
| D323,198 S | 1/1992 | Dalebout |
| D323,199 S | 1/1992 | Dalebout |
| D323,863 S | 2/1992 | Watterson |
| 5,088,729 A | 2/1992 | Dalebout |
| 5,090,694 A | 2/1992 | Pauls |
| 5,102,380 A | 4/1992 | Jacobson |
| 5,104,120 A | 4/1992 | Watterson |
| 5,108,093 A | 4/1992 | Watterson |
| D326,491 S | 5/1992 | Dalebout |
| 5,122,105 A | 6/1992 | Engel |
| 5,135,216 A | 8/1992 | Bingham |
| 5,147,265 A | 9/1992 | Pauls |
| 5,149,084 A | 9/1992 | Dalebout |
| 5,149,312 A | 9/1992 | Croft et al. |
| 5,171,196 A | 12/1992 | Lynch |
| D332,347 S | 1/1993 | Raadt |
| 5,190,505 A | 3/1993 | Dalebout |
| 5,192,255 A | 3/1993 | Dalebout |
| 5,195,937 A | 3/1993 | Engel |
| 5,203,826 A | 4/1993 | Dalebout |
| D335,511 S | 5/1993 | Engel |
| D335,905 S | 5/1993 | Cutter |
| D336,498 S | 6/1993 | Engel |
| 5,217,487 A | 6/1993 | Engel |
| D337,361 S | 7/1993 | Engel |
| D337,666 S | 7/1993 | Peterson |
| D337,799 S | 7/1993 | Cutter |
| 5,226,866 A | 7/1993 | Engel |
| 5,244,446 A | 9/1993 | Engel |
| 5,247,853 A | 9/1993 | Dalebout |
| 5,259,611 A | 11/1993 | Dalebout |
| D342,106 S | 12/1993 | Campbell |
| 5,279,528 A | 1/1994 | Dalebout |
| D344,112 S | 2/1994 | Smith |
| D344,557 S | 2/1994 | Ashby |
| 5,282,776 A | 2/1994 | Dalebout |
| 5,295,931 A | 3/1994 | Dreibelbis |
| 5,302,161 A | 4/1994 | Loubert |
| D347,251 S | 5/1994 | Dreibelbis |
| 5,316,534 A | 5/1994 | Dalebout |
| D348,493 S | 7/1994 | Ashby |
| D348,494 S | 7/1994 | Ashby |
| 5,328,164 A | 7/1994 | Soga |
| D349,931 S | 8/1994 | Bostic |
| 5,336,142 A | 8/1994 | Dalebout |
| 5,344,376 A | 9/1994 | Bostic |
| D351,202 S | 10/1994 | Bingham |
| D351,435 S | 10/1994 | Peterson |
| D351,633 S | 10/1994 | Bingham |
| D352,534 S | 11/1994 | Dreibelbis |
| D353,422 S | 12/1994 | Bostic |
| 5,372,559 A | 12/1994 | Dalebout |
| 5,374,228 A | 12/1994 | Buisman |
| 5,382,221 A | 1/1995 | Hsu |
| 5,387,168 A | 2/1995 | Bostic |
| 5,393,690 A | 2/1995 | Fu |
| D356,128 S | 3/1995 | Smith |
| 5,409,435 A | 4/1995 | Daniels |
| 5,429,563 A | 7/1995 | Engel |
| 5,431,612 A | 7/1995 | Holden |
| D360,915 S | 8/1995 | Bostic |
| 5,468,205 A | 11/1995 | McFall |
| 5,489,249 A | 2/1996 | Brewer |
| 5,492,517 A | 2/1996 | Bostic |
| D367,689 S | 3/1996 | Wilkinson |
| 5,511,740 A | 4/1996 | Loubert |
| 5,512,025 A | 4/1996 | Dalebout |
| D370,949 S | 6/1996 | Furner |
| D371,176 S | 6/1996 | Furner |
| 5,527,245 A | 6/1996 | Dalebout |
| 5,529,553 A | 6/1996 | Finlayson |
| 5,540,429 A | 7/1996 | Dalebout |
| 5,549,533 A | 8/1996 | Olson |
| 5,554,085 A | 9/1996 | Dalebout |
| 5,569,128 A | 10/1996 | Dalebout |
| 5,591,105 A | 1/1997 | Dalebout |
| 5,591,106 A | 1/1997 | Dalebout |

(56) References Cited

U.S. PATENT DOCUMENTS

| | | |
|---|---|---|
| 5,595,556 A | 1/1997 | Dalebout |
| 5,607,375 A | 3/1997 | Dalebout |
| 5,611,539 A | 3/1997 | Watterson |
| 5,622,527 A | 4/1997 | Watterson |
| 5,626,538 A | 5/1997 | Dalebout |
| 5,626,542 A | 5/1997 | Dalebout |
| D380,024 S | 6/1997 | Novak |
| 5,637,059 A | 6/1997 | Dalebout |
| D380,509 S | 7/1997 | Wilkinson |
| 5,643,153 A | 7/1997 | Nylen |
| 5,645,509 A | 7/1997 | Brewer |
| D384,118 S | 9/1997 | Deblauw |
| 5,662,557 A | 9/1997 | Watterson |
| 5,669,857 A | 9/1997 | Watterson |
| 5,672,140 A | 9/1997 | Watterson |
| 5,674,156 A | 10/1997 | Watterson |
| 5,674,453 A | 10/1997 | Watterson |
| 5,676,624 A | 10/1997 | Watterson |
| 5,683,331 A | 11/1997 | Dalebout |
| 5,683,332 A * | 11/1997 | Watterson ............ A63B 22/025 482/54 |
| D387,825 S | 12/1997 | Fleck |
| 5,695,433 A | 12/1997 | Buisman |
| 5,695,434 A | 12/1997 | Dalebout |
| 5,695,435 A | 12/1997 | Dalebout |
| 5,702,325 A | 12/1997 | Watterson |
| 5,704,879 A | 1/1998 | Watterson |
| 5,718,657 A | 2/1998 | Dalebout et al. |
| 5,720,200 A | 2/1998 | Anderson |
| 5,720,698 A | 2/1998 | Dalebout |
| D392,006 S | 3/1998 | Dalebout |
| 5,722,922 A | 3/1998 | Watterson |
| 5,733,229 A | 3/1998 | Dalebout |
| 5,743,833 A | 4/1998 | Watterson |
| 5,762,584 A | 6/1998 | Daniels |
| 5,762,587 A | 6/1998 | Dalebout |
| 5,772,560 A | 6/1998 | Watterson |
| 5,810,698 A | 9/1998 | Hullett |
| 5,827,155 A | 10/1998 | Jensen |
| 5,830,114 A | 11/1998 | Halfen |
| 5,860,893 A | 1/1999 | Watterson |
| 5,860,894 A | 1/1999 | Dalebout |
| 5,899,834 A | 5/1999 | Dalebout |
| D412,953 S | 8/1999 | Armstrong |
| D413,948 S | 9/1999 | Dalebout |
| 5,951,441 A | 9/1999 | Dalebout |
| 5,951,448 A | 9/1999 | Bolland |
| D416,596 S | 11/1999 | Armstrong |
| 6,003,166 A | 12/1999 | Hald |
| 6,019,710 A | 2/2000 | Dalebout |
| 6,027,429 A | 2/2000 | Daniels |
| 6,033,347 A | 3/2000 | Dalebout et al. |
| D425,940 S | 5/2000 | Halfen |
| 6,059,692 A | 5/2000 | Hickman |
| D428,949 S | 8/2000 | Simonson |
| 6,123,646 A | 9/2000 | Colassi |
| 6,171,217 B1 | 1/2001 | Cutler |
| 6,171,219 B1 | 1/2001 | Simonson |
| 6,174,267 B1 | 1/2001 | Dalebout |
| 6,193,631 B1 | 2/2001 | Hickman |
| 6,228,003 B1 | 5/2001 | Hald |
| 6,238,323 B1 | 5/2001 | Simonson |
| 6,251,052 B1 | 6/2001 | Simonson |
| 6,261,022 B1 | 7/2001 | Dalebout et al. |
| 6,280,362 B1 | 8/2001 | Dalebout et al. |
| 6,296,594 B1 | 10/2001 | Simonson |
| D450,872 S | 11/2001 | Dalebout |
| 6,312,363 B1 | 11/2001 | Watterson |
| D452,338 S | 12/2001 | Dalebout |
| D453,543 S | 2/2002 | Cutler |
| D453,948 S | 2/2002 | Cutler |
| 6,350,218 B1 | 2/2002 | Dalebout et al. |
| 6,387,020 B1 | 5/2002 | Simonson |
| 6,413,191 B1 | 7/2002 | Harris |
| 6,422,980 B1 | 7/2002 | Simonson |
| 6,447,424 B1 | 9/2002 | Ashby et al. |
| 6,458,060 B1 | 10/2002 | Watterson |
| 6,458,061 B2 | 10/2002 | Simonson |
| 6,471,622 B1 | 10/2002 | Hammer |
| 6,563,225 B2 | 5/2003 | Soga |
| 6,601,016 B1 | 7/2003 | Brown |
| 6,623,140 B2 | 9/2003 | Watterson |
| 6,626,799 B2 | 9/2003 | Watterson |
| 6,652,424 B2 | 11/2003 | Dalebout |
| 6,685,607 B1 | 2/2004 | Olson |
| 6,695,581 B2 | 2/2004 | Wasson |
| 6,701,271 B2 | 3/2004 | Willner |
| 6,702,719 B1 | 3/2004 | Brown |
| 6,712,740 B2 | 3/2004 | Simonson |
| 6,730,002 B2 | 5/2004 | Hald |
| 6,743,153 B2 | 6/2004 | Watterson |
| 6,746,371 B1 | 6/2004 | Brown |
| 6,749,537 B1 | 6/2004 | Hickman |
| 6,761,667 B1 | 7/2004 | Cutler et al. |
| 6,770,015 B2 | 8/2004 | Simonson |
| 6,786,852 B2 | 9/2004 | Watterson |
| 6,808,472 B1 | 10/2004 | Hickman |
| 6,821,230 B2 | 11/2004 | Dalebout |
| 6,830,540 B2 | 12/2004 | Watterson |
| 6,863,641 B1 | 3/2005 | Brown |
| 6,866,613 B1 | 3/2005 | Brown |
| 6,875,160 B2 | 4/2005 | Watterson |
| D507,311 S | 7/2005 | Butler |
| 6,918,858 B2 | 7/2005 | Watterson |
| 6,921,351 B1 | 7/2005 | Hickman |
| 6,974,404 B1 | 12/2005 | Watterson |
| 6,997,852 B2 | 2/2006 | Watterson |
| 7,025,713 B2 | 4/2006 | Dalebout |
| D520,085 S | 5/2006 | Willardson |
| 7,044,897 B2 | 5/2006 | Myers |
| 7,052,442 B2 | 5/2006 | Watterson |
| 7,060,006 B1 | 6/2006 | Watterson |
| 7,060,008 B2 | 6/2006 | Watterson et al. |
| 7,070,539 B2 | 7/2006 | Brown |
| 7,097,588 B2 | 8/2006 | Watterson |
| D527,776 S | 9/2006 | Willardson |
| 7,112,168 B2 | 9/2006 | Dalebout et al. |
| 7,128,693 B2 | 10/2006 | Brown |
| 7,166,062 B1 | 1/2007 | Watterson |
| 7,166,064 B2 | 1/2007 | Watterson |
| 7,169,087 B2 | 1/2007 | Ercanbrack |
| 7,169,093 B2 | 1/2007 | Simonson |
| 7,192,388 B2 | 3/2007 | Dalebout |
| 7,250,022 B2 | 7/2007 | Dalebout |
| 7,282,016 B2 | 10/2007 | Simonson |
| 7,285,075 B2 | 10/2007 | Cutler |
| 7,344,481 B2 | 3/2008 | Watterson |
| 7,377,882 B2 | 5/2008 | Watterson |
| 7,425,188 B2 | 9/2008 | Ercanbrack |
| 7,429,236 B2 | 9/2008 | Dalebout |
| 7,455,622 B2 | 11/2008 | Watterson |
| 7,482,050 B2 | 1/2009 | Olson |
| D588,655 S | 3/2009 | Utykanski |
| 7,510,509 B2 | 3/2009 | Hickman |
| 7,537,546 B2 | 5/2009 | Watterson |
| 7,537,549 B2 | 5/2009 | Nelson |
| 7,537,552 B2 | 5/2009 | Dalebout |
| 7,540,828 B2 | 6/2009 | Watterson |
| 7,549,947 B2 | 6/2009 | Hickman |
| 7,556,590 B2 | 7/2009 | Watterson et al. |
| 7,563,203 B2 | 7/2009 | Dalebout |
| 7,575,536 B1 | 8/2009 | Hickman |
| 7,601,105 B1 | 10/2009 | Gipson, III |
| 7,604,573 B2 | 10/2009 | Dalebout |
| D604,373 S | 11/2009 | Dalebout |
| 7,618,350 B2 | 11/2009 | Dalebout |
| 7,618,357 B2 | 11/2009 | Dalebout |
| 7,625,315 B2 | 12/2009 | Hickman |
| 7,625,321 B2 | 12/2009 | Simonson |
| 7,628,730 B1 | 12/2009 | Watterson |
| 7,628,737 B2 | 12/2009 | Kowallis |
| 7,637,847 B1 | 12/2009 | Hickman |
| 7,645,212 B2 | 1/2010 | Ashby et al. |
| 7,645,213 B2 | 1/2010 | Watterson |

(56) References Cited

U.S. PATENT DOCUMENTS

| | | |
|---|---|---|
| 7,658,698 B2 | 2/2010 | Pacheco |
| 7,674,205 B2 | 3/2010 | Dalebout |
| 7,713,171 B1 | 5/2010 | Hickman |
| 7,713,172 B2 | 5/2010 | Watterson |
| 7,713,180 B2 | 5/2010 | Wickens |
| 7,717,828 B2 | 5/2010 | Simonson |
| 7,736,279 B2 | 6/2010 | Dalebout |
| 7,740,563 B2 | 6/2010 | Dalebout |
| 7,749,144 B2 | 7/2010 | Hammer |
| 7,766,797 B2 | 8/2010 | Dalebout |
| 7,771,329 B2 | 8/2010 | Dalebout |
| 7,775,940 B2 | 8/2010 | Dalebout |
| 7,789,800 B1 | 9/2010 | Watterson |
| 7,798,946 B2 | 9/2010 | Dalebout |
| 7,815,550 B2 | 10/2010 | Watterson |
| 7,857,731 B2 | 12/2010 | Hickman |
| 7,862,475 B2 | 1/2011 | Watterson |
| 7,862,478 B2 | 1/2011 | Watterson |
| 7,862,483 B2 | 1/2011 | Hendrickson |
| D635,207 S | 3/2011 | Dalebout |
| 7,901,330 B2 | 3/2011 | Dalebout |
| 7,909,740 B2 | 3/2011 | Dalebout |
| 7,980,996 B2 | 7/2011 | Hickman |
| 7,981,000 B2 | 7/2011 | Watterson |
| 7,985,164 B2 | 7/2011 | Ashby |
| 8,029,415 B2 | 10/2011 | Ashby et al. |
| 8,033,960 B1 | 10/2011 | Dalebout |
| D650,451 S | 12/2011 | Olson |
| 8,075,454 B2 * | 12/2011 | Piggins ................ A63B 21/156 482/94 |
| D652,877 S | 1/2012 | Dalebout |
| 8,152,702 B2 | 4/2012 | Pacheco |
| D659,775 S | 5/2012 | Olson |
| D659,777 S | 5/2012 | Watterson |
| D660,383 S | 5/2012 | Watterson |
| D664,613 S | 7/2012 | Dalebout |
| 8,251,874 B2 | 8/2012 | Ashby |
| 8,298,123 B2 | 10/2012 | Hickman |
| 8,298,125 B2 | 10/2012 | Colledge |
| D671,177 S | 11/2012 | Sip |
| D671,178 S | 11/2012 | Sip |
| D673,626 S | 1/2013 | Olson |
| 8,690,735 B2 | 4/2014 | Watterson |
| D707,763 S | 6/2014 | Cutler |
| 8,740,753 B2 | 6/2014 | Olson |
| 8,758,201 B2 | 6/2014 | Ashby |
| 8,771,153 B2 | 7/2014 | Dalebout |
| 8,784,270 B2 | 7/2014 | Watterson |
| 8,808,148 B2 | 8/2014 | Watterson |
| 8,814,762 B2 | 8/2014 | Butler |
| D712,493 S | 9/2014 | Ercanbrack |
| 8,840,075 B2 | 9/2014 | Olson |
| 8,845,493 B2 | 9/2014 | Watterson |
| 8,870,726 B2 | 10/2014 | Watterson |
| 8,876,668 B2 | 11/2014 | Hendrickson |
| 8,894,549 B2 | 11/2014 | Colledge |
| 8,894,555 B2 | 11/2014 | Olson |
| 8,911,330 B2 | 12/2014 | Watterson |
| 8,920,288 B2 | 12/2014 | Dalebout |
| 8,986,165 B2 | 3/2015 | Ashby |
| 8,992,364 B2 | 3/2015 | Law |
| 8,992,387 B2 | 3/2015 | Watterson |
| D726,476 S | 4/2015 | Ercanbrack |
| 9,028,368 B2 | 5/2015 | Ashby |
| 9,028,370 B2 | 5/2015 | Watterson |
| 9,039,578 B2 | 5/2015 | Dalebout |
| D731,011 S | 6/2015 | Buchanan |
| 9,072,930 B2 | 7/2015 | Ashby |
| 9,119,983 B2 | 9/2015 | Rhea |
| 9,123,317 B2 | 9/2015 | Watterson |
| 9,126,071 B2 | 9/2015 | Smith |
| 9,126,072 B2 | 9/2015 | Watterson |
| 9,138,615 B2 | 9/2015 | Olson |
| 9,142,139 B2 | 9/2015 | Watterson |
| 9,144,703 B2 | 9/2015 | Dalebout |
| 9,149,683 B2 | 9/2015 | Watterson |
| 9,186,535 B2 | 11/2015 | Ercanbrack |
| 9,186,549 B2 | 11/2015 | Watterson |
| 9,254,409 B2 | 2/2016 | Dalebout |
| 9,254,416 B2 | 2/2016 | Ashby |
| 9,278,248 B2 | 3/2016 | Tyger |
| 9,278,249 B2 | 3/2016 | Watterson |
| 9,278,250 B2 | 3/2016 | Buchanan |
| 9,289,648 B2 | 3/2016 | Watterson |
| 9,339,691 B2 | 5/2016 | Brammer |
| 9,352,185 B2 | 5/2016 | Hendrickson |
| 9,352,186 B2 | 5/2016 | Watterson |
| 9,375,605 B2 | 6/2016 | Tyger |
| 9,381,394 B2 | 7/2016 | Mortensen |
| 9,387,387 B2 | 7/2016 | Dalebout |
| 9,393,453 B2 | 7/2016 | Watterson |
| 9,403,047 B2 | 8/2016 | Olson |
| 9,403,051 B2 | 8/2016 | Cutler |
| 9,421,416 B2 | 8/2016 | Mortensen |
| 9,457,219 B2 | 10/2016 | Smith |
| 9,457,220 B2 | 10/2016 | Olson |
| 9,457,222 B2 | 10/2016 | Dalebout |
| 9,460,632 B2 | 10/2016 | Watterson |
| 9,463,356 B2 | 10/2016 | Rhea |
| 9,468,794 B2 | 10/2016 | Barton |
| 9,468,798 B2 | 10/2016 | Dalebout |
| 9,480,874 B2 | 11/2016 | Cutler |
| 9,492,704 B2 | 11/2016 | Mortensen |
| 9,498,668 B2 | 11/2016 | Smith |
| 9,517,378 B2 | 12/2016 | Ashby |
| 9,521,901 B2 | 12/2016 | Dalebout |
| 9,533,187 B2 | 1/2017 | Dalebout |
| 9,539,461 B2 | 1/2017 | Ercanbrack |
| 9,579,544 B2 | 2/2017 | Watterson |
| 9,586,086 B2 | 3/2017 | Dalebout |
| 9,586,090 B2 | 3/2017 | Watterson |
| 9,604,099 B2 | 3/2017 | Taylor |
| 9,616,276 B2 | 4/2017 | Dalebout |
| 9,616,278 B2 | 4/2017 | Olson |
| 9,623,281 B2 | 4/2017 | Hendrickson |
| 9,636,567 B2 | 5/2017 | Brammer |
| 9,675,839 B2 | 6/2017 | Dalebout |
| 9,682,307 B2 | 6/2017 | Dalebout |
| 9,694,234 B2 | 7/2017 | Dalebout |
| 9,694,242 B2 | 7/2017 | Ashby |
| 9,737,755 B2 | 8/2017 | Dalebout |
| 9,744,400 B2 * | 8/2017 | Cole ................ A63B 23/03541 |
| 9,757,605 B2 | 9/2017 | Olson |
| 9,764,186 B2 | 9/2017 | Dalebout |
| 9,767,785 B2 | 9/2017 | Ashby |
| 9,795,822 B2 | 10/2017 | Smith |
| 9,808,672 B2 | 11/2017 | Dalebout |
| 9,849,326 B2 | 12/2017 | Smith |
| 9,878,210 B2 | 1/2018 | Watterson |
| 9,889,334 B2 | 2/2018 | Ashby |
| 9,889,339 B2 | 2/2018 | Douglass |
| 9,937,376 B2 | 4/2018 | McInelly |
| 9,937,377 B2 | 4/2018 | McInelly |
| 9,937,378 B2 | 4/2018 | Dalebout |
| 9,937,379 B2 | 4/2018 | Mortensen |
| 9,943,719 B2 | 4/2018 | Smith |
| 9,943,722 B2 | 4/2018 | Dalebout |
| 9,948,037 B2 | 4/2018 | Ashby |
| 9,968,816 B2 | 5/2018 | Olson |
| 9,968,821 B2 | 5/2018 | Finlayson |
| 9,968,823 B2 | 5/2018 | Cutler |
| 10,010,755 B2 | 7/2018 | Watterson |
| 10,010,756 B2 | 7/2018 | Watterson |
| 10,029,145 B2 | 7/2018 | Douglass |
| D826,350 S | 8/2018 | Hochstrasser |
| 10,046,196 B2 | 8/2018 | Ercanbrack |
| D827,733 S | 9/2018 | Hochstrasser |
| 10,065,064 B2 | 9/2018 | Smith |
| 10,071,285 B2 | 9/2018 | Smith |
| 10,085,586 B2 | 10/2018 | Smith |
| 10,086,254 B2 | 10/2018 | Watterson |
| 10,136,842 B2 | 11/2018 | Ashby |
| 10,186,161 B2 | 1/2019 | Watterson |
| 10,188,890 B2 | 1/2019 | Olson |

(56) References Cited

U.S. PATENT DOCUMENTS

| | | |
|---|---|---|
| 10,207,143 B2 | 2/2019 | Dalebout |
| 10,207,145 B2 | 2/2019 | Tyger |
| 10,207,147 B2 | 2/2019 | Ercanbrack |
| 10,207,148 B2 | 2/2019 | Powell |
| 10,212,994 B2 | 2/2019 | Watterson |
| 10,220,259 B2 | 3/2019 | Brammer |
| 10,226,396 B2 | 3/2019 | Ashby |
| 10,226,664 B2 | 3/2019 | Dalebout |
| 10,252,109 B2 | 4/2019 | Watterson |
| 10,258,828 B2 | 4/2019 | Dalebout |
| 10,272,317 B2 | 4/2019 | Watterson |
| 10,279,212 B2 | 5/2019 | Dalebout |
| 10,293,211 B2 | 5/2019 | Watterson |
| D852,292 S | 6/2019 | Cutler |
| 10,343,017 B2 | 7/2019 | Jackson |
| 10,376,736 B2 | 8/2019 | Powell |
| 10,388,183 B2 | 8/2019 | Watterson |
| 10,391,361 B2 | 8/2019 | Watterson |
| D864,320 S | 10/2019 | Weston |
| D864,321 S | 10/2019 | Weston |
| 10,426,989 B2 | 10/2019 | Dalebout |
| 10,433,612 B2 | 10/2019 | Ashby |
| 10,441,840 B2 | 10/2019 | Dalebout |
| 10,449,416 B2 | 10/2019 | Dalebout |
| 10,471,299 B2 | 11/2019 | Powell |
| D868,909 S | 12/2019 | Cutler |
| 10,492,519 B2 | 12/2019 | Capell |
| 10,493,349 B2 | 12/2019 | Watterson |
| 10,500,473 B2 | 12/2019 | Watterson |
| 10,543,395 B2 | 1/2020 | Powell et al. |
| 10,561,877 B2 | 2/2020 | Workman |
| 10,561,893 B2 | 2/2020 | Chatterton |
| 10,561,894 B2 | 2/2020 | Dalebout |
| 10,569,121 B2 | 2/2020 | Watterson |
| 10,569,123 B2 | 2/2020 | Hochstrasser |
| 10,625,137 B2 | 4/2020 | Dalebout |
| 10,758,767 B2 | 8/2020 | Olson |
| 10,786,706 B2 | 9/2020 | Smith |
| 10,864,407 B2 | 12/2020 | Watterson |
| 10,967,214 B1 | 4/2021 | Olson |
| 17,462,687 | 8/2021 | Ashby |
| 63,229,794 | 8/2021 | Brammer |
| 63,235,002 | 8/2021 | Smith |
| 17,476,899 | 9/2021 | Willardson |
| 17,450,679 | 10/2021 | Watterson |
| 17,492,104 | 10/2021 | Ashby |
| 63,254,470 | 10/2021 | Powell |
| 63,278,714 | 11/2021 | Taylor |
| 63,289,997 | 12/2021 | Taylor |
| 2002/0016235 A1 | 2/2002 | Ashby |
| 2002/0043909 A1* | 4/2002 | Nielsen ................ A47B 85/08 312/237 |
| 2002/0077221 A1 | 6/2002 | Dalebout |
| 2002/0159253 A1 | 10/2002 | Dalebout |
| 2003/0045406 A1 | 3/2003 | Stone |
| 2004/0091307 A1 | 5/2004 | James |
| 2004/0171464 A1 | 9/2004 | Ashby |
| 2004/0171465 A1 | 9/2004 | Hald |
| 2005/0049123 A1 | 3/2005 | Dalebout |
| 2005/0077805 A1 | 4/2005 | Dalebout |
| 2005/0107229 A1 | 5/2005 | Wickens |
| 2005/0164839 A1 | 7/2005 | Watterson |
| 2005/0272577 A1 | 12/2005 | Olson |
| 2007/0117683 A1 | 5/2007 | Ercanbrack |
| 2007/0254778 A1 | 11/2007 | Ashby |
| 2008/0051256 A1 | 2/2008 | Ashby |
| 2008/0242520 A1 | 10/2008 | Hubbard |
| 2008/0300110 A1 | 12/2008 | Smith |
| 2009/0105052 A1 | 4/2009 | Dalebout |
| 2010/0022351 A1 | 1/2010 | Lanfermann et al. |
| 2010/0242246 A1 | 9/2010 | Dalebout |
| 2010/0317488 A1* | 12/2010 | Cartaya ............... A63B 71/0622 482/5 |
| 2012/0237911 A1 | 9/2012 | Watterson |
| 2012/0295774 A1 | 11/2012 | Dalebout |
| 2013/0123083 A1 | 5/2013 | Sip |
| 2013/0165195 A1 | 6/2013 | Watterson |
| 2013/0172152 A1 | 7/2013 | Watterson |
| 2013/0172153 A1 | 7/2013 | Watterson |
| 2013/0178334 A1 | 7/2013 | Brammer |
| 2013/0178768 A1 | 7/2013 | Dalebout |
| 2013/0190136 A1 | 7/2013 | Watterson |
| 2013/0196298 A1 | 8/2013 | Watterson |
| 2013/0196821 A1 | 8/2013 | Watterson |
| 2013/0196822 A1 | 8/2013 | Watterson |
| 2013/0218585 A1 | 8/2013 | Watterson |
| 2013/0244836 A1 | 9/2013 | Maughan |
| 2013/0267383 A1 | 10/2013 | Watterson |
| 2013/0268101 A1 | 10/2013 | Brammer |
| 2013/0274067 A1 | 10/2013 | Watterson |
| 2013/0281241 A1 | 10/2013 | Watterson |
| 2014/0024499 A1 | 1/2014 | Watterson |
| 2014/0073970 A1 | 3/2014 | Ashby |
| 2014/0121071 A1 | 5/2014 | Strom |
| 2014/0135173 A1 | 5/2014 | Watterson |
| 2014/0274574 A1 | 9/2014 | Shorten |
| 2014/0274579 A1 | 9/2014 | Olson |
| 2014/0287884 A1 | 9/2014 | Buchanan |
| 2014/0309085 A1 | 10/2014 | Watterson |
| 2015/0182779 A1 | 7/2015 | Dalebout |
| 2015/0182781 A1 | 7/2015 | Watterson |
| 2015/0238817 A1 | 8/2015 | Watterson |
| 2015/0250418 A1 | 9/2015 | Ashby |
| 2015/0251055 A1 | 9/2015 | Ashby |
| 2015/0253735 A1 | 9/2015 | Watterson |
| 2015/0253736 A1 | 9/2015 | Watterson |
| 2015/0258560 A1 | 9/2015 | Ashby |
| 2016/0058335 A1 | 3/2016 | Ashby |
| 2016/0063615 A1 | 3/2016 | Watterson |
| 2016/0074698 A1* | 3/2016 | Figueroa ................ A47C 17/38 5/2.1 |
| 2016/0092909 A1 | 3/2016 | Watterson |
| 2016/0101311 A1 | 4/2016 | Workman |
| 2016/0107065 A1 | 4/2016 | Brammer |
| 2016/0121074 A1 | 5/2016 | Ashby |
| 2016/0148535 A1 | 5/2016 | Ashby |
| 2016/0148536 A1 | 5/2016 | Ashby |
| 2016/0158595 A1 | 6/2016 | Dalebout |
| 2016/0346595 A1 | 12/2016 | Dalebout |
| 2017/0036053 A1 | 2/2017 | Smith |
| 2017/0056711 A1 | 3/2017 | Dalebout |
| 2017/0056715 A1 | 3/2017 | Dalebout |
| 2017/0124912 A1 | 5/2017 | Ashby |
| 2017/0193578 A1 | 7/2017 | Watterson |
| 2017/0266489 A1 | 9/2017 | Douglass |
| 2017/0270820 A1 | 9/2017 | Ashby |
| 2018/0036585 A1 | 2/2018 | Powell |
| 2018/0085630 A1 | 3/2018 | Capell |
| 2018/0089396 A1 | 3/2018 | Capell |
| 2018/0099116 A1 | 4/2018 | Ashby |
| 2018/0099180 A1 | 4/2018 | Wilkinson |
| 2018/0111034 A1 | 4/2018 | Watterson |
| 2018/0117385 A1 | 5/2018 | Watterson |
| 2018/0117393 A1 | 5/2018 | Ercanbrack |
| 2018/0154209 A1 | 6/2018 | Watterson |
| 2018/0200566 A1 | 7/2018 | Weston |
| 2019/0058370 A1 | 2/2019 | Tinney |
| 2019/0080624 A1 | 3/2019 | Watterson |
| 2019/0168072 A1 | 6/2019 | Brammer |
| 2019/0178313 A1 | 6/2019 | Wrobel |
| 2019/0192898 A1 | 6/2019 | Dalebout |
| 2019/0192952 A1 | 6/2019 | Powell |
| 2019/0223612 A1 | 7/2019 | Watterson |
| 2019/0232112 A1 | 8/2019 | Dalebout |
| 2019/0269958 A1 | 9/2019 | Dalebout |
| 2019/0269971 A1 | 9/2019 | Capell |
| 2019/0275366 A1 | 9/2019 | Powell |
| 2019/0282852 A1 | 9/2019 | Dalebout |
| 2019/0328079 A1 | 10/2019 | Ashby |
| 2019/0329091 A1 | 10/2019 | Powell |
| 2019/0376585 A1 | 12/2019 | Buchanan |
| 2020/0009417 A1 | 1/2020 | Dalebout |
| 2020/0016459 A1 | 1/2020 | Smith |
| 2020/0047055 A1* | 2/2020 | Ward ................ A63B 21/153 |

(56) References Cited

U.S. PATENT DOCUMENTS

| | | | |
|---|---|---|---|
| 2020/0222751 A1 | 7/2020 | Dalebout |
| 2020/0238130 A1 | 7/2020 | Silcock |
| 2020/0338389 A1 | 7/2020 | Dalebout |
| 2020/0254295 A1 | 8/2020 | Watterson |
| 2020/0254309 A1 | 8/2020 | Watterson |
| 2020/0254311 A1 | 8/2020 | Watterson |
| 2020/0391069 A1 | 8/2020 | Olson |
| 2020/0368575 A1 | 11/2020 | Hays |
| 2021/0001177 A1 | 1/2021 | Smith |
| 2021/0046351 A1 | 2/2021 | Ercanbrack |
| 2021/0046353 A1 | 2/2021 | Dalebout |
| 2021/0086013 A1 | 3/2021 | Olson |
| 2021/0086018 A1 | 3/2021 | Dalebout |
| 2021/0086032 A1 | 3/2021 | Watterson |
| 2021/0106899 A1 | 4/2021 | Willardson |

FOREIGN PATENT DOCUMENTS

| | | | |
|---|---|---|---|
| CN | 108652269 A * | 10/2018 | ............. A47B 81/00 |
| CN | 208784067 | 4/2019 | |
| CN | 11060002 | 4/2020 | |
| DE | 19961264 A1 * | 6/2001 | ........... A47B 67/005 |
| DE | 202008006444 | 7/2008 | |
| EP | 3846150 | 7/2021 | |
| JP | 2018202174 | 12/2018 | |
| KR | 200473830 Y1 * | 7/2014 | ............... A47G 1/02 |
| TW | 588843 | 5/2004 | |
| TW | M414131 | 10/2011 | |
| TW | M457473 | 7/2013 | |
| TW | 201506864 | 2/2015 | |
| WO | WO2019014558 | 1/2019 | |
| WO | WO2019016406 | 1/2019 | |
| WO | WO-2019231982 A1 * | 12/2019 | ............. A45D 42/00 |

OTHER PUBLICATIONS

U.S. Appl. No. 15/973,176, filed May 7, 2018, Melanie Douglass.
U.S. Appl. No. 17/014,935, filed Sep. 8, 2020, Megan Jane Ostler.
U.S. Appl. No. 17/067,310, filed Oct. 9, 2020, Jared Willardson.
U.S. Appl. No. 17/159,814, filed Jan. 27, 2021, William R. Dalebout.
U.S. Appl. No. 62/912,451, filed Sep. 9, 2019, Megan Jane Ostler.
International Search Report and Written Opinion from PCT Application No. PCT/US2022/014544, dated May 13, 2022; 10 pages.
U.S. Appl. No. 17/172,880, filed Feb. 10, 2021, Darren C. Ashby.
U.S. Appl. No. 17/159,814, filed Jan. 27, 2021, William T. Dalebout.
U.S. Appl. No. 17/149,299, filed Jan. 14, 2021, William T. Dalebout.
U.S. Appl. No. 29/702,127, filed Sep. 16, 2019, Gordon Cutler.
U.S. Appl. No. 17/141,880, filed Jan. 5, 2021, Wade A. Powell.
U.S. Appl. No. 17/066,485, filed Oct. 9, 2020, Jared Weston.
U.S. Appl. No. 17/178,173, filed Feb. 17, 2021, Evan Charles Tinney.
U.S. Appl. No. 17/217,938, filed Apr. 8, 2021, Eric S. Watterson.
U.S. Appl. No. 17/014,935, filed Sep. 9, 2019, Megan Jane Ostler.
U.S. Appl. No. 17/096,350, filed Nov. 12, 2020, William T. Dalebout.
U.S. Appl. No. 17/204,704, filed Mar. 17, 2021, Chris Nascimento.
U.S. Appl. No. 17/209,714, filed Mar. 23, 2021, Chase Brammer.
U.S. Appl. No. 63/086,793, filed Oct. 2, 2020, Darren C. Ashby.
U.S. Appl. No. 63/073,081, filed Sep. 1, 2020, Darren C. Ashby.
U.S. Appl. No. 63/079,697, filed Sep. 17, 2020, Jared Willardson.
U.S. Appl. No. 63/134,036, filed Jan. 5, 2021, Gaylen Ercanbrack.
U.S. Appl. No. 63/165,498, filed Mar. 24, 2021, Mark Archer.
U.S. Appl. No. 63/150,066, filed Feb. 16, 2021, Kent M. Smith.
U.S. Appl. No. 63/156,801, filed Mar. 4, 2021, Eric S. Watterson.
U.S. Appl. No. 63/200,903, filed Apr. 2, 2021, Eric S. Watterson.
U.S. Appl. No. 17/589,075, filed Jan. 31, 2022, Darren C. Ashby.
U.S. Appl. No. 17/589,027, filed Jan. 31, 2022, William T. Dalebout.
U.S. Appl. No. 63/299,357, filed Jan. 13, 2022, George Samuel Toles.
U.S. Appl. No. 63/298,170, filed Jan. 10, 2022, Gaylen Ercanbrack.
U.S. Appl. No. 17/568,882, filed Jan. 5, 22, Gaylen Ercanbrack.
U.S. Appl. No. 63/290,557, filed Dec. 16, 2021, Darren C. Ashby.
U.S. Appl. No. 63/290,455, filed Dec. 16, 2021 Keith A. Taylor.
U.S. Appl. No. 63/289,997, filed Dec. 15, 2021, Keith A. Taylor.
U.S. Appl. No. 63/278,714, filed Nov. 12, 2021, Keith A. Taylor.
U.S. Appl. No. 17/450,679, filed Oct. 12, 2021, Scott R. Watterson.
U.S. Appl. No. 63/254,470, filed Oct. 11, 2021, Wade A. Powell.
U.S. Appl. No. 17/492,104, filed Oct. 1, 2021, Darren C. Ashby.
U.S. Appl. No. 17/476,899, filed Sep. 16, 2021, Jared Willardson.
U.S. Appl. No. 17/462,687, filed Aug. 31, 2021, Darren C. Ashby.
U.S. Appl. No. 63/235,002, filed Aug. 19, 2021, Kent M. Smith.
U.S. Appl. No. 63/229,794, filed Aug. 12, 2021, Chase Brammer.
U.S. Appl. No. 63/216,313, filed Jun. 29, 2021, Scott R. Watterson.
U.S. Appl. No. 63/211,870, filed Jun. 17, 2021, Blake Watterson.
U.S. Appl. No. 63/188,431, filed May 13, 2021, Robert Plummer.
U.S. Appl. No. 63/187,348, filed May 11, 2021, William T. Dalebout.
U.S. Appl. No. 63/180,521, filed Apr. 27, 2021, Blake Watterson.
U.S. Appl. No. 63/179,094, filed Apr. 23, 2021, Scott R. Watterson.
Office Action in Taiwanese Patent Application No. 109139469, dated Jun. 7, 2021, 15 pages.
Office Action in European Patent Application No. 20207111.4; dated Nov. 26, 2021, 8 pages.
Office Action in Taiwanese Patent Application No. 110144591, dated Feb. 17, 2022, 13 pages.
Taiwanese Office Action for Taiwan Patent Application No. 111104304, dated Oct. 19, 2022, 17 pages.

\* cited by examiner

EXERCISE STORAGE SYSTEM

CROSS-REFERENCE TO RELATED APPLICATIONS

This application claims priority to and benefit of U.S. Provisional Patent Application No. 62/934,291, filed Nov. 12, 2019, entitled "Exercise Storage System" and U.S. Provisional Patent Application No. 62/934,297, filed Nov. 12, 2019, entitled "Exercise Storage System" which are hereby incorporated by reference in their entireties.

U.S. Provisional Patent Application Ser. No. 62/804,146, filed on Feb. 11, 2019, and entitled "Cable and Power Rack Exercise Machine," is hereby incorporated by reference in its entirety for all intents and purposes by this reference.

BACKGROUND

Background and Relevant Art

Exercise equipment may take up a large volume of space. To save space, a storage system, such as a cabinet or shelves, may be used to store the exercise equipment. Furthermore, exercise facilities may include one or more displays, in which a user may observe and/or participate in an exercise program. Exercise facilities may also include one or more mirrors, in which the user may observe him or herself performing an exercise. The storage system may be separated from the display and/or the mirrors, thereby wasting time and effort by the user to transfer exercise equipment from the storage system to the display or the mirrors.

BRIEF SUMMARY

In some embodiments, an exercise storage system includes a storage compartment having a first side and a second side. The exercise storage system includes a door. A display is connected to the door and includes a mirrored surface. A hinge connects the storage compartment to the door. In some embodiments, the hinge has a first axis of rotation at the first side of the storage compartment and a second axis of rotation at the door. In some embodiments, the hinge includes a first lateral member rotatably connected to a wall of the storage compartment and rotatably connected to the door. A second lateral member is rotatably connected to the wall of the storage compartment and rotatably connected to the door.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to devices, systems, and methods for exercise storage systems. Exercise storage systems of the present disclosure may include a door with a display. The display may include a backlit display and a mirrored surface. In some embodiments, the backlit display may be visible through the mirrored surface and the mirrored surface may provide a visible reflection of people and objects while the backlit display is running. The display may be located on a door, which opens to allow the user to access and use exercise equipment within a cabinet while viewing the display.

Figure 1:
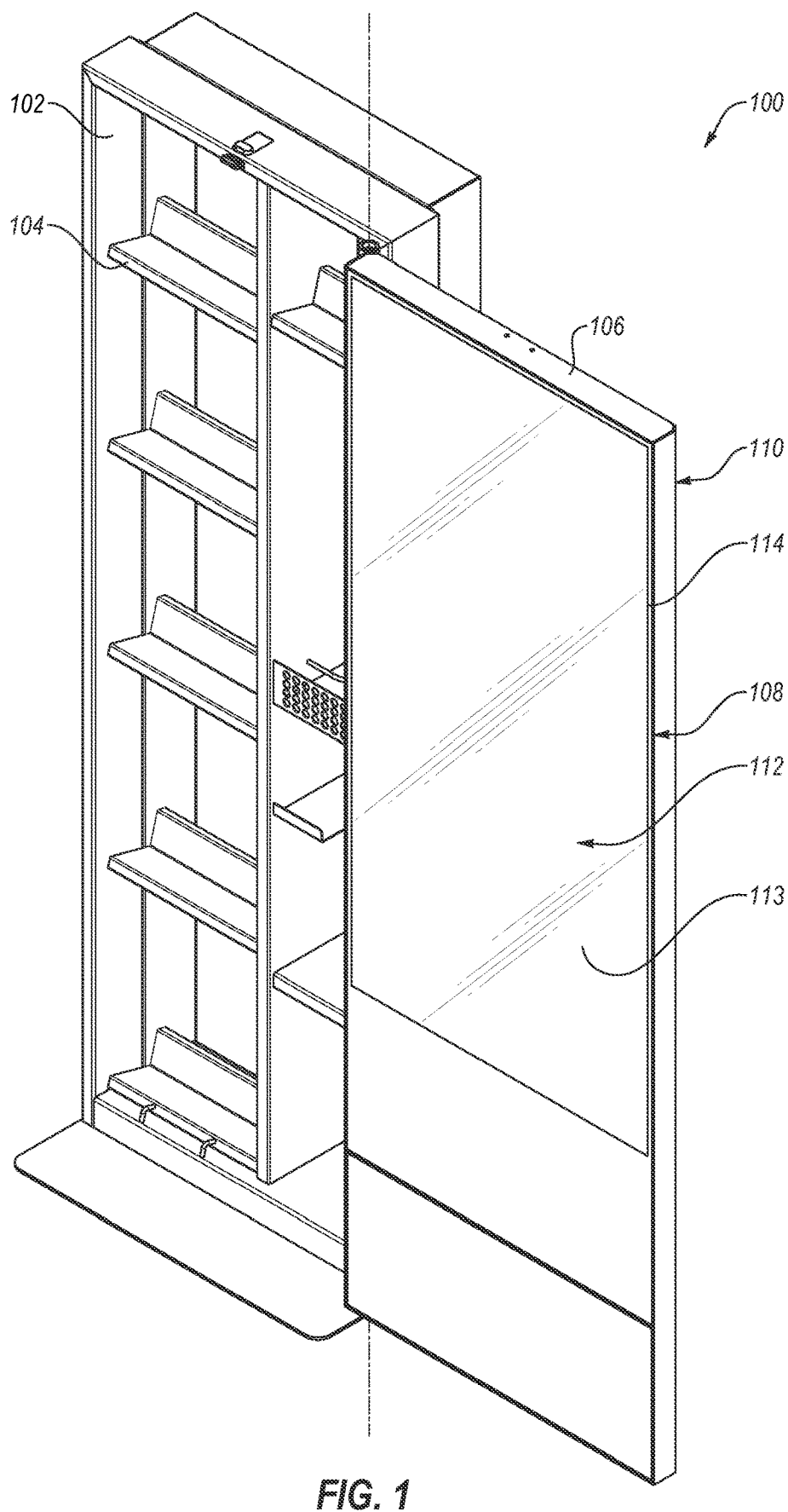
FIG. 1 is a perspective view of a representation of an exercise storage system, according to at least one embodiment of the present disclosure.

FIG. 1 is a representation of an exercise storage system 100, according to at least one embodiment of the present disclosure. The exercise storage system includes a storage compartment 102. In some embodiments, the storage compartment 102 may include exercise equipment. The exercise equipment may include any piece of exercise equipment. For example, the exercise equipment may include an exercise machine, such as a treadmill, a stationary bicycle, an elliptical machine, a rowing machine, or any other exercise machine. In some embodiments, the exercise machine may include a collapsible or foldable exercise machine, and the exercise machine may fold into the storage compartment. In this manner, the storage compartment 102 may be unobtrusive and/or attractive compact storage for the exercise machine.

As discussed above, the exercise machine may include a collapsible or a foldable treadmill. In some embodiments, the foldable treadmill may include a front end connected to a cable. A support on the cabinet may be connected to a spool connected to the cable. A motor may cause the spool to wind. This may cause the cable to lift the front end of the treadmill deck. In some embodiments, the deck may be lifted while exercising, causing an increase in the incline experienced by the user. In some embodiments, the deck may be lifted into a storage position inside the storage compartment 102. In some embodiments, the treadmill (or any exercise machine) may be completely stored within the storage compartment 102. In other words, a door 106 of the exercise container may completely close an opening of the storage compartment 102, fully containing and removing the treadmill from view.

The storage compartment 102 includes one or more storage elements 104, such as shelves, hooks, and so forth. Any exercise equipment may be placed on the storage elements 104, such as weights, barbells, kettle balls, resistance bands, jump ropes, mats, gloves, clothes, shoes, any other exercise equipment, and combinations thereof.

The exercise storage system 100 includes a door 106. In a closed position (not shown), the door 106 may close over the storage compartment 102 such that the exercise equipment on the storage elements 104 is not visible or physically accessible. In the open position shown, the door 106 may be removed from the opening to the storage compartment 102 such that exercise equipment on the storage elements 104 is visible and accessible to the user.

The door 106 includes an outer face 108 and an inner face 110. In the closed position, the inner face 110 faces the opening of the storage compartment 102 and the outer face 108 faces outward, away from the storage compartment 102. In the open position shown in FIG. 1, the outer face 108 may be oriented to face in a plurality of directions. For example, in the embodiment shown in FIG. 1, the outer face 108 is shown as facing outward, or in the same direction as the opening in the storage compartment 102. Thus, the outer face 108 shown is facing the same direction in the open position as it faced in the closed position.

The outer face 108 of the door 106 includes a display 112. The display 112 includes a mirrored surface 113. The mirrored surface 113 may allow a user to view himself while exercising. This may allow the user to examiner his form while exercising. In this manner, the user may critique and correct his form for exercises, which may help reduce injury, improve muscle strength, improve flexibility, and combinations thereof. Furthermore, because the mirrored surface 113 is located on the door 106, it is conveniently located near the exercise equipment stored in the storage compartment 102 (e.g., on the storage elements 104). This may allow the user to transition between exercises quickly and smoothly, without wasting time by walking from the exercise storage system 100 to a mirror or exercise station.

The display 112 includes a backlit display 114, such as a monitor, a television, or other backlit display. When lit, the backlit display 114 may be visible through the mirrored surface 113. The backlit display 114 may present one or more exercise programs through the mirrored surface 113. The user may follow instructions on the exercise program to perform an exercise. In some embodiments, the exercise program may include instructions regarding the performance of exercises, including exercises using the exercise equipment stored in the exercise storage system 100.

In some embodiments, the backlit display 114 may include a touchscreen display. For example, the user may be able to interact with the backlit display 114 by touching the display 112. The user may provide input to the backlit display 114, respond to queries and other input from the backlit display 114, and otherwise interact with the backlit display 114. In this manner, the user may not need to keep track of a remote or install an application on a mobile device to interact with the display 112 and/or the exercise program shown on the display 112.

In some embodiments, the mirrored surface 113 may be a one-way mirror. In other words, the display 112 may show the backlit display 114 and reflect the user or another image on the mirrored surface 113. In this manner, the user may view herself on the mirrored surface 113 and simultaneously view the backlit display 114. Thus, the user may perform exercises instructed by an exercise program on the backlit display 114, and simultaneously compare her execution of the exercises seen in the mirrored surface to the performance shown on the exercise program. This may improve the user experience, assist the user to improve her exercise form, and allow the user to more effectively perform exercises.

Figure 2:
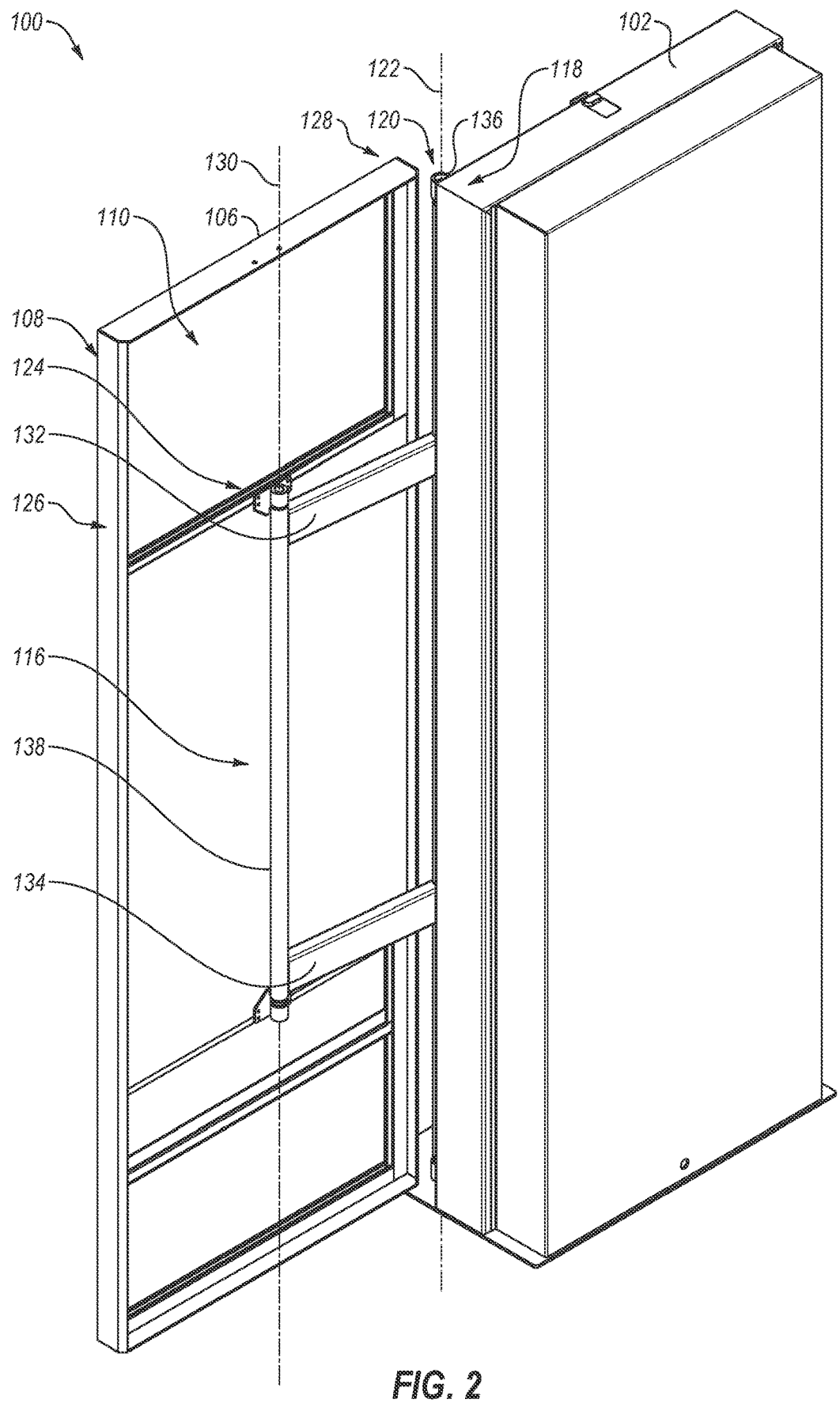
FIG. 2 is another perspective view of the exercise storage system of FIG. 1.

FIG. 2 is a representation of a perspective view of the exercise storage system 100 of FIG. 1, according to at least one embodiment of the present disclosure. In the embodiment shown, the door 106 is connected to the storage compartment 102 with a hinge 116. The hinge 116 may allow the outer face 108 of the door 106 to maintain an adjustable viewing angle. For example, the user may desire for the display (e.g., display 112 of FIG. 1) on the outer face 108 of the door 106 to face the user, even when the door 106 is open. Conventional hinges change the viewing angle of the door 106 by angling the outer face 108 of the door 106 away from the storage compartment 102 when opening. A hinge 116 according to embodiments of the present disclosure may allow the outer face 108 of the door to face the user, even as the door 106 is opened. This may allow the user to access the exercise equipment while facing the display (e.g., the mirrored surface and the backlit display).

In the embodiment shown, the hinge 116 is connected to a first end 118 of the storage compartment 102 with a rotating connection 120. The hinge 116 may rotate about a first axis of rotation 122 at the first end 118 of the storage compartment 102. In some embodiments, the hinge 116 may be connected to the inner face of the door with a rotating connection. The hinge 116 is connected to the inner face 110 of the door 106 at a middle position 124 of the door 106. In other words, the hinge 116 may be connected to the door 106 at a position between a first edge 126 and a second edge 128 of the door 106. The hinge 116 may rotate about a second axis of rotation 130 at the connection to the inner face 110 of the door 106.

In some embodiments, the door 106 may be opened by rotating the hinge 116 about the first axis of rotation 122. This may move the door 106 away from the opening of the storage compartment 102. The viewing angle of the display may be adjusted by rotating the hinge 116 about the second axis of rotation 130. This may change the orientation of the door 106 relative to the user. Thus, the user may orient the door 106 according to her needs and preferences.

In some embodiments, the door 106 may open such that the outer face 108 is facing the same direction as the opening. In other words, the outer face 108 may be parallel to the opening when in an open position, and the outer face may remain pointed in the same direction as in a closed position. As discussed above, this may allow the user to face the display and easily access exercise equipment from the opening, without significantly changing position.

In the embodiment shown, the hinge includes a first lateral member 132 and a second lateral member 134. The first lateral member 132 may be rotatably connected to the storage compartment 102 at the first end 118 and rotatably connected to the door 106 at the inner face 110 of the door 106. The second lateral member 134 may be rotatably connected to the storage compartment 102 at the first end 118 and rotatably connected to the door 106 at the inner face 110 of the door 106. A wall shaft 136 may connect the first lateral member 132 and the second lateral member 134 at the first end 118. A door shaft 138 may connect the first lateral member 132 and the second lateral member 134 at the door 106. In some embodiments, the wall shaft 136 may be rotatably connected to the first end 118, and the door shaft 138 may be rotatably connected to the door 106. In this manner, the hinge 116 may be strong and support a heavy door. In some embodiments, the hinge 116 may include any number of lateral members, such as 1, 2, 3, 4, 5, 6, 7, 8, or more lateral members.

Figure 3:
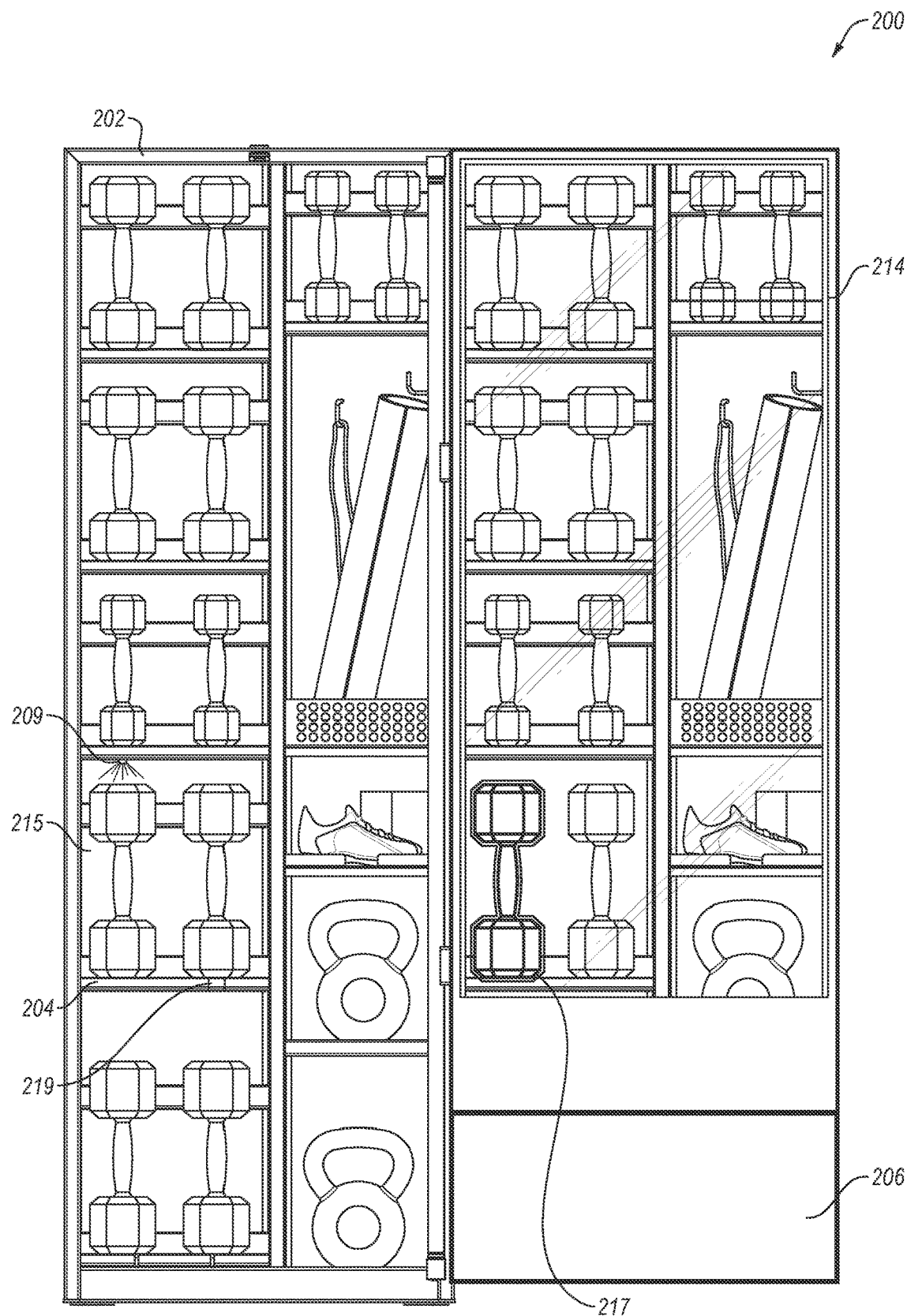
FIG. 3 is a front view of a representation of an exercise storage system, according to at least one embodiment of the present disclosure.

FIG. 3 is a representation of an exercise storage system 200, according to at least one embodiment of the present disclosure. In some embodiments, the storage system may include one or more pieces of exercise equipment, such as dumbbells, shoes, kettle balls, yoga mats, jump ropes, resistance bands, clothes, gloves, towels, exercise machines, any other exercise equipment, and combinations thereof. In the embodiment shown, the backlit display 214 on the door 206 may display a representation of the contents of the storage compartment 202. In some embodiments, the contents of the storage compartment 202 may be schematically shown on the backlit display 214. In some embodiments, a video representation of the contents of the storage compartment 202 may be shown on the backlit display 214. The representation of the contents of the storage compartment 202 may be shown when the door 206 is open or closed. In some embodiments, the representation of the contents of the storage compartment 202 may include a full-size representation of the contents of the storage compartment 202. In this scenario, the representation of the contents of the storage compartment 202 may not include the entirety of the contents, but only that portion visible on the backlit display 214. In some embodiments, the representation of the contents of the storage compartment 202 may include a reduced-size representation of the contents so that the entirety of the contents may be displayed.

In some embodiments, an exercise program may highlight or otherwise emphasize the equipment to be used during an exercise. For example, a portion of the exercise program may use a dumbbell 215. In some embodiments, at the point in the exercise program when the dumbbell 215 is to be used, an indicator light 209 above the desired dumbbell 215 may be lit up. The indicator light 209 may indicate to the user which dumbbell 215 (or other piece of exercise equipment) should be used by the user.

In some embodiments, at the point in the exercise program when the dumbbell 215 is to be used, a representation of the dumbbell to be used may be highlighted 217 on the backlit display 214. For example, the backlit display 214 may highlight the position of the dumbbell to be used. In some examples, the backlit display 214 may highlight the shape of the dumbbell to be used. In some examples, the backlit display 214 may show the entirety of the interior of the storage compartment 202, and the location and dumbbell to be used may be highlighted 217 in the backlit display 214. In some embodiments, a range of dumbbells may be used, depending on the user's fitness level, strength, and fitness goals. Thus, rather than an individual dumbbell or other piece of exercise equipment being highlighted, a location of dumbbells or other pieces of exercise equipment may be highlighted, with the user choosing the individual dumbbell.

In some embodiments, the piece of exercise equipment highlighted 217 may be located on one of the storage elements 204. In some embodiments, the storage elements 204 may include one or more sensors 219 configured to determine the presence of the piece of exercise equipment. The sensors 219 may include a weight sensor, position sensor, or other location-determining sensor. The sensor 219 may determine the presence of the piece of exercise equipment. In some embodiments, when the exercise program highlights the piece of exercise equipment, the exercise program may pause until the user selects the correct piece of exercise equipment after receiving the presence information from the sensor. Similarly, when a specific exercise has been completed, the exercise program may not resume until the piece of exercise equipment has been placed back in the correct location.

In some embodiments, the exercise program may instruct the user to utilize any piece of exercise equipment. For example, the exercise program may instruct the user to pick up a dumbbell, deploy a foldable treadmill, retrieve a jump rope, roll out a yoga mat, use any other piece of exercise equipment, or any combination of the foregoing.

Figure 4:
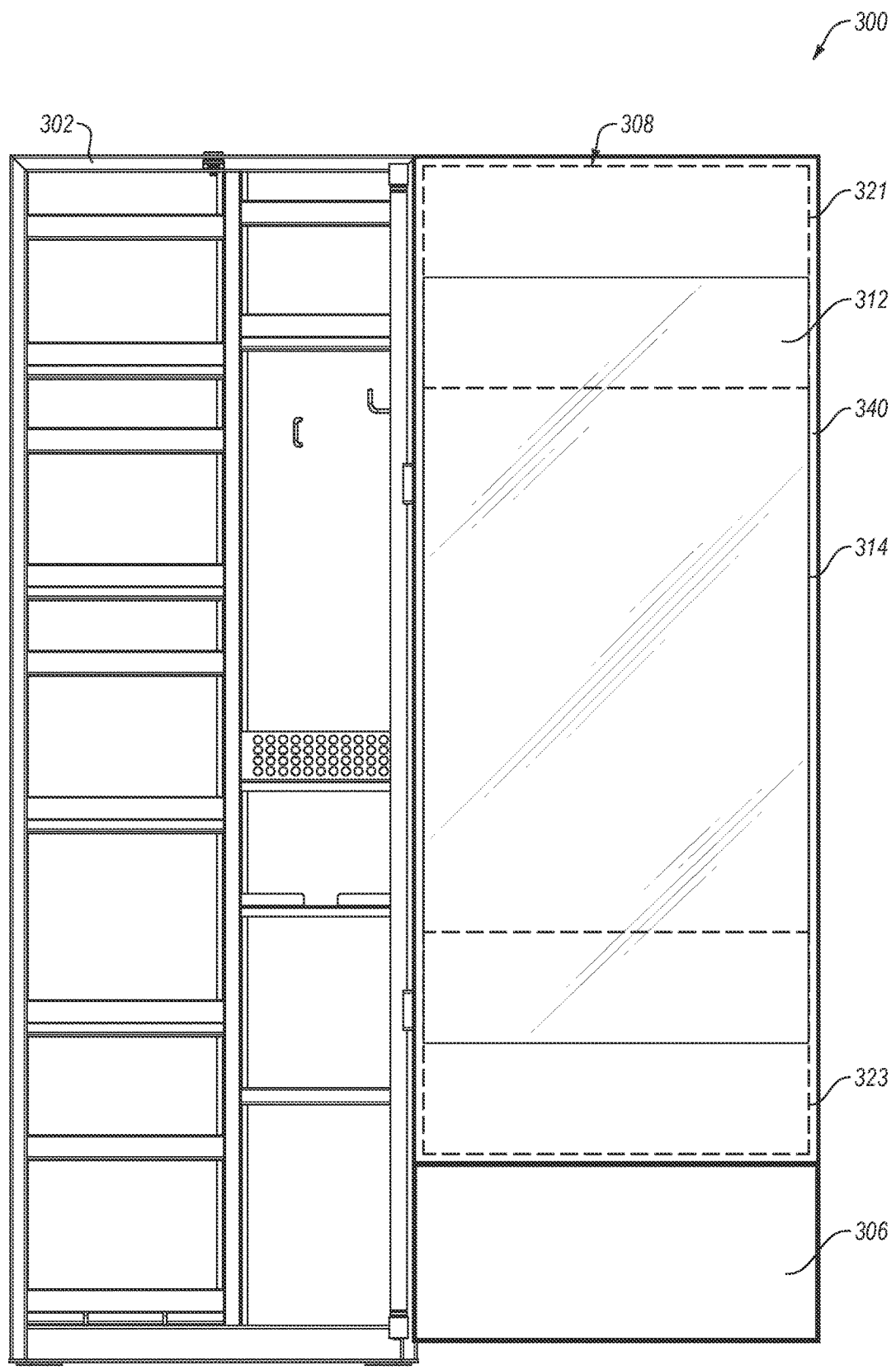
FIG. 4 is another front view of a representation of an exercise storage system, according to at least one embodiment of the present disclosure.

FIG. 4 is a front view of an exercise storage system 300, according to at least one embodiment of the present disclosure. In the embodiment shown, the door 306 is shown in the open position, with the outer face 308 facing the same direction as the opening to the storage compartment 302. The display 312 may be mounted to the outer face 308 of the door 306 with an adjustable connection 340. For example, the display 312 may be mounted to the outer face 308 of the door 306 with a sliding connection 340, and the display 312 may have a vertically adjustable position. For example, the display may be slidably mounted on brackets, and the display 312 may vertically move on the brackets.

In at least one embodiment, a vertically adjustable display 312 may allow the user to customize and/or optimally locate the display 312 for use during an exercise activity. This may allow the user to place the display 312 in a position with a better view and/or to view different portions of his body in the mirrored display during exercise activities. For example, when the user is performing a shoulder press with free weights, the user may wish to have the display 312 located vertically higher to better view himself. In some examples, when the user is performing a yoga move while sitting down, crouching, or resting a portion of his weight on his hands, the user may wish to have the display 312 located vertically lower to better view himself. In some examples, different users may have different heights; a taller user may place the display 312 at a higher position than a shorter user.

In some embodiments, the vertical position of the display 312 may be manually adjustable. In other words, the vertical position of the display may be changed by an application of an upward or a downward force by the user. In some embodiments, a motor may change the vertical position of the display 312. For example, a worm gear, linear motor, hydraulic piston, pneumatic piston, or other electronic and/or electromechanical system may change the vertical position of the display 312.

In the embodiment shown, the backlit display 314 may be movable behind the display 312 (e.g., the mirrored surface). In other words, the backlit display 314 may be movable independent of the rest of the display 312. Thus, the backlit display 314 may be movable between an upper position and a lower position based on the preferences of the user. In some embodiments, the user may choose to move the backlit display 314 to an upper position 321. For example, when doing an elevated exercise, such as a pullup, the user may wish for the backlit display 314 to be raised to the upper position 321. In some embodiments, the user may wish for the backlit display 314 to be in the lower position 323. For example, when doing an exercise near the floor, such as a yoga move, the user may wish for the backlit display 314 to be located near the floor.

Figure 5:
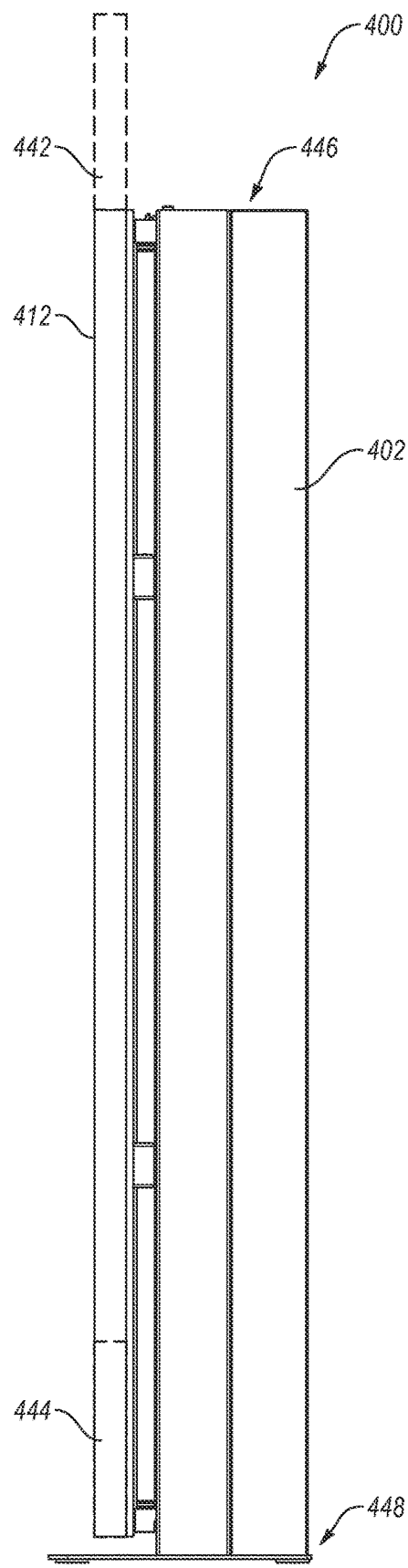
FIG. 5 is a side view of a representation of an exercise storage system, according to at least one embodiment of the present disclosure.

FIG. 5 is a side view of the exercise storage system 400, according to at least one embodiment of the present disclosure. In the embodiment shown, the display 412 may be vertically adjustable between an upper position 442 and a lower position 444. As may be seen, in the upper position 442, the display 412 is located above an upper end 446 of the storage compartment 402. In the lower position 444, the display 412 may be located at or proximate a lower end 448 of the storage compartment 402.

Figure 6:
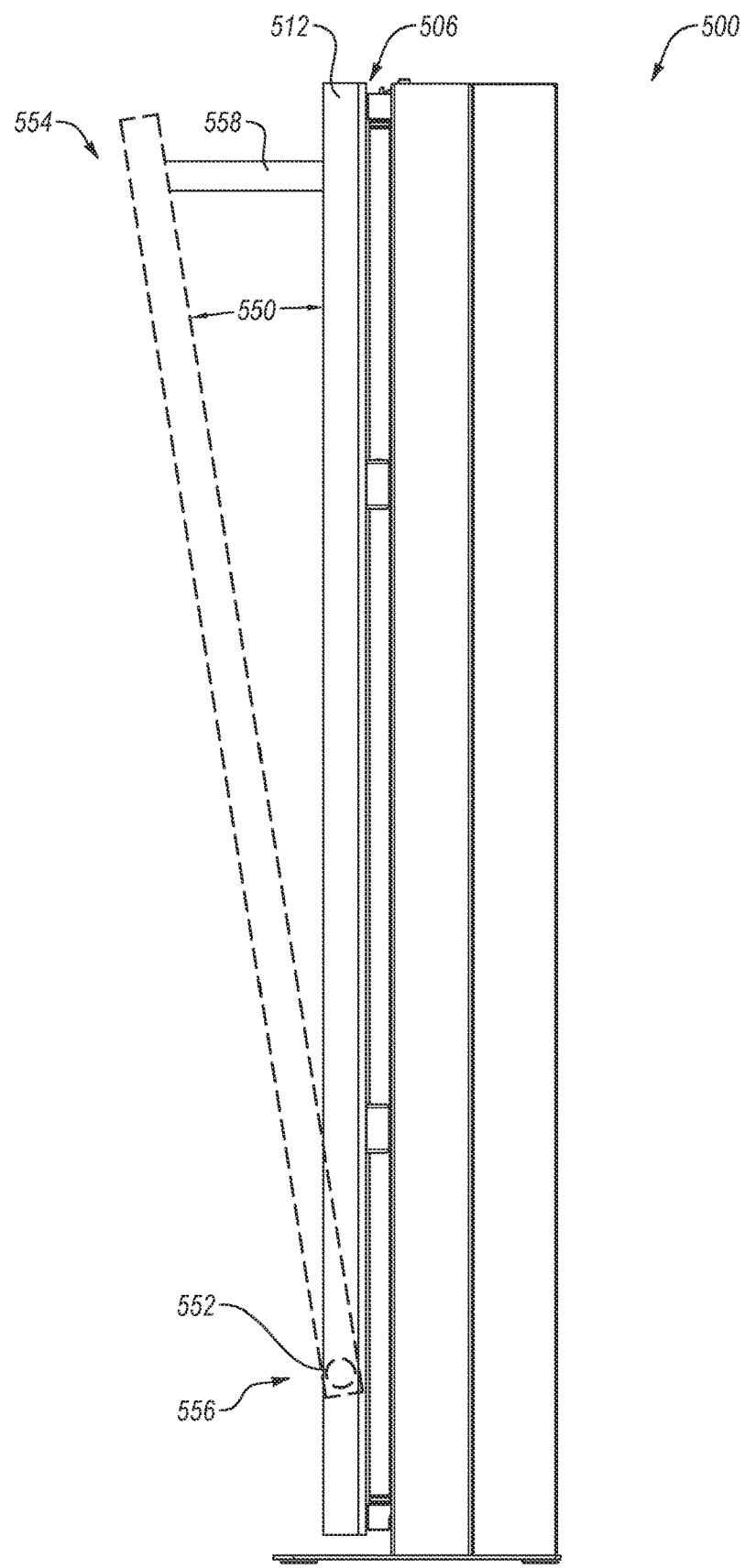
FIG. 6 is a representation of an exercise storage system, according to at least one embodiment of the present disclosure.

FIG. 6 is a side view of an exercise storage system 500, according to at least one embodiment of the present disclosure. In the embodiment shown, a vertical angle 550 of the display 512 is adjustable. For example, the display 512 may be mounted to the door 506 with a display hinge 552, and the display 512 may be vertically rotated about the display hinge 552. In at least one embodiment, this may allow the user to change the vertical angle 550 of the display 512. In this manner, the user may orient the display 512 as desired. For example, the user may wish to orient the display 512 downward to change the angle with which she may view herself performing a lower activity (e.g., a floor-based activity), and thereby observe and/or critique her form. Similarly, the user may wish to orient the display upward to better view the form of an elevated activity, such as pull-ups or other elevated activity.

In some embodiments, the vertical angle 550 of the display 512 may be manually adjustable. In other words, the vertical angle 550 of the display 512 may be changed by an application of a torque about the display hinge 552 by the user. In some embodiments, a motor may change the vertical angle 550 of the display 512. For example, a motor may rotate the display 512 about the display hinge 552. In some embodiments, the upper portion 554 or the lower portion 556 of the display 512 may be moved linearly to change the vertical angle 550. For example, the upper portion 554 of the display 512 may be moved manually, or with a linear drive 558, such as a worm gear, linear motor, hydraulic piston, pneumatic piston, or other electronic and/or electromechanical system may change the vertical angle 550 of the display.

Figure 7:
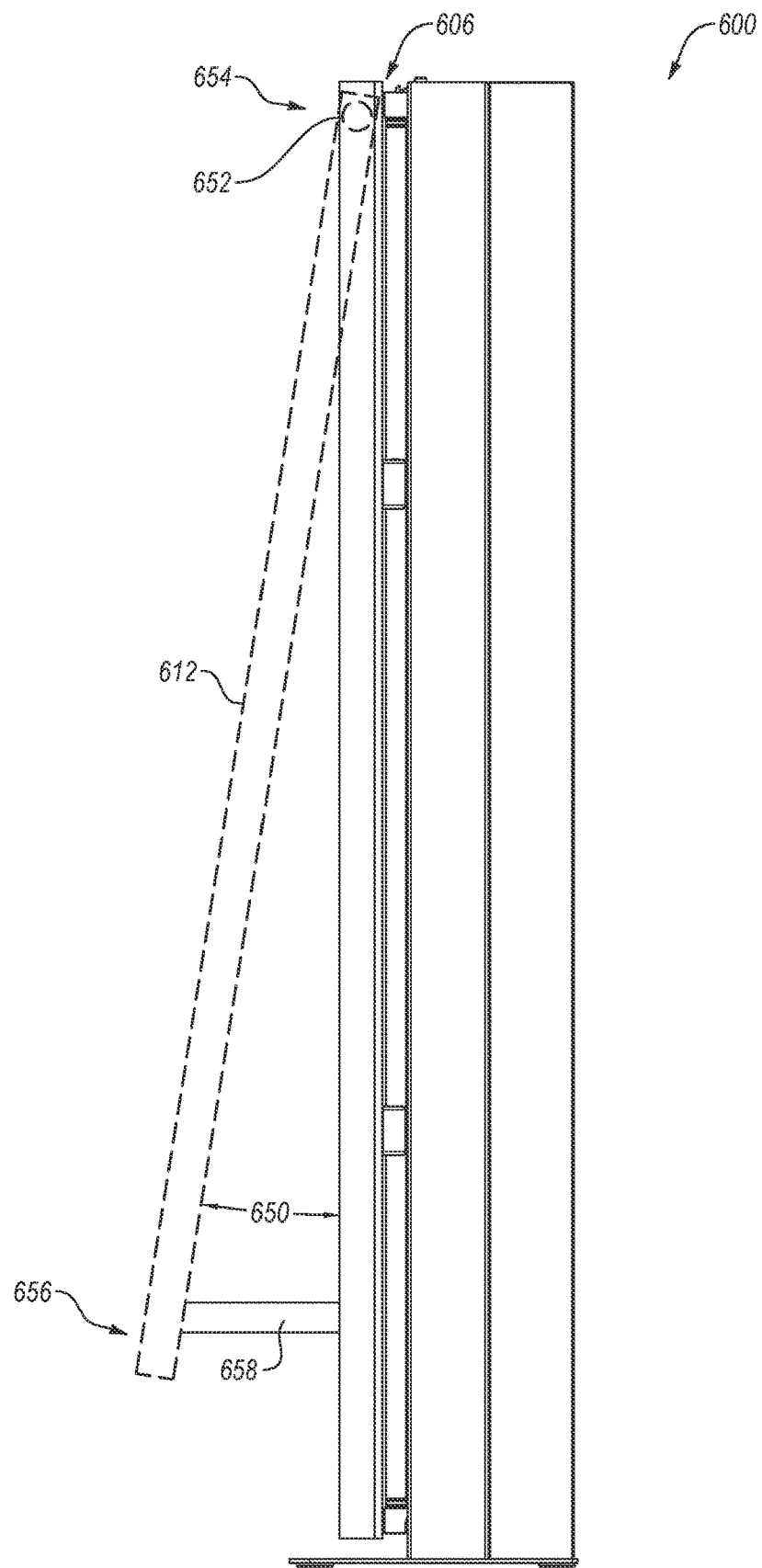
FIG. 7 is another representation of an exercise storage system, according to at least one embodiment of the present disclosure.

FIG. 7 is a side view of an exercise storage system 600, according to at least one embodiment of the present disclosure. In the embodiment shown, a vertical angle 650 of the display 612 is adjustable. For example, the display 612 may be mounted to the door 606 with a display hinge 652, and the display 612 may be vertically rotated about the display hinge 652. In at least one embodiment, this may allow the user to change the vertical angle 650 of the display 612. In this manner, the user may orient the display 612 as desired. For example, the user may wish to orient the display 612 upward to change the angle with which she may view herself performing a raised activity (e.g., a hanging activity), and thereby observe and/or critique her form.

In some embodiments, the vertical angle 650 of the display 612 may be manually adjustable. In other words, the vertical angle 650 of the display 612 may be changed by an application of a torque about the display hinge 652 by the user. In some embodiments, a motor may change the vertical angle 650 of the display 612. For example, a motor may rotate the display 612 about the display hinge 652. In some embodiments, the upper portion 654 or the lower portion 656 of the display 612 may be moved linearly to change the vertical angle 650. For example, the lower portion 656 of the display 612 may be moved manually, or with a linear drive 658, such as a worm gear, linear motor, hydraulic piston, pneumatic piston, or other electronic and/or electromechanical system may change the vertical angle 650 of the display.

In some embodiments, the hinge (e.g., the hinge 116) may include a linkage that is rotationally connected to the door 606 such that the vertical angle 650 of the door may be adjustable. For example, the hinge may be connected to a center of the door 606, and the entire door 606, rather than just the display 612 is rotated.

Figure 8:
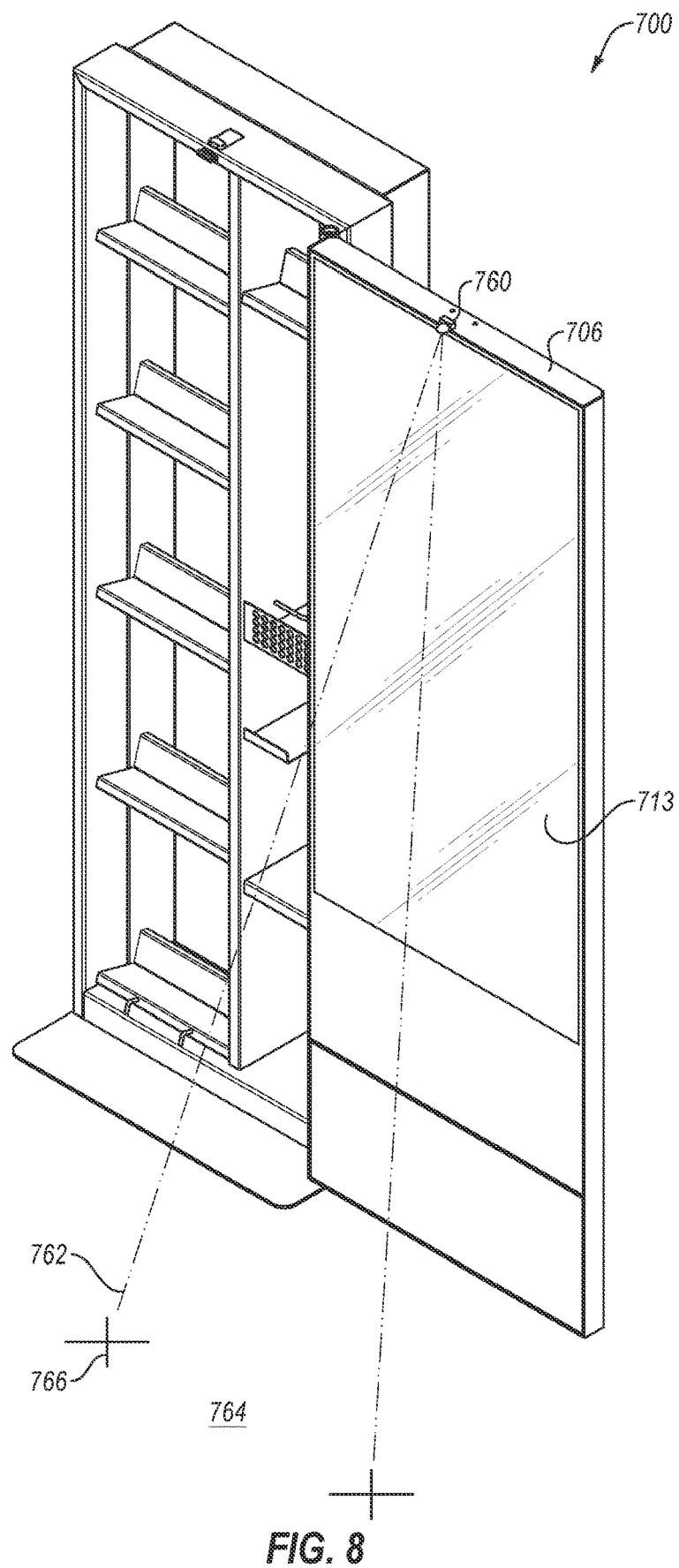
FIG. 8 is yet another representation of an exercise storage system, according to at least one embodiment of the present disclosure.

FIG. 8 is a representation of an exercise storage system 700, according to at least one embodiment of the present disclosure. In some embodiments, the exercise storage system 700 may provide guidance for a user. For example, the door 706 may include a light projector 760. The light projector 760 may be located behind the mirrored surface 713, and may project light 762, including visible light, such as a laser or other light, onto a surface 764. The projected light 762 may produce an image on the surface 764 that may assist a user in performing a workout. For example, the projected light 762 may be employed to show a user a location 766 to place their feet, to show a user how far to step or jump, to show a user how to properly position their hips, knees, joints, head, shoulders, or any other body part to properly perform a cable or free weight exercise. In some embodiments, the projected light 762 may project marks that are displayed on the surface 764. In some embodiments, the location 766 may include a projection of the body part to be placed at that location. In some embodiments, as the exercise program progresses, the marks at the location 766 may change shape and/or location, which may indicate to the user to change position, form, change another aspect of the exercise, or any combination thereof. In some embodiments, the surface 764 may include the floor, a wall, a user's body, or any other surface on which the projected light 762 may be transmitted. This may assist a user in performing exercises, which may improve the exercise experience.

Figure 9:
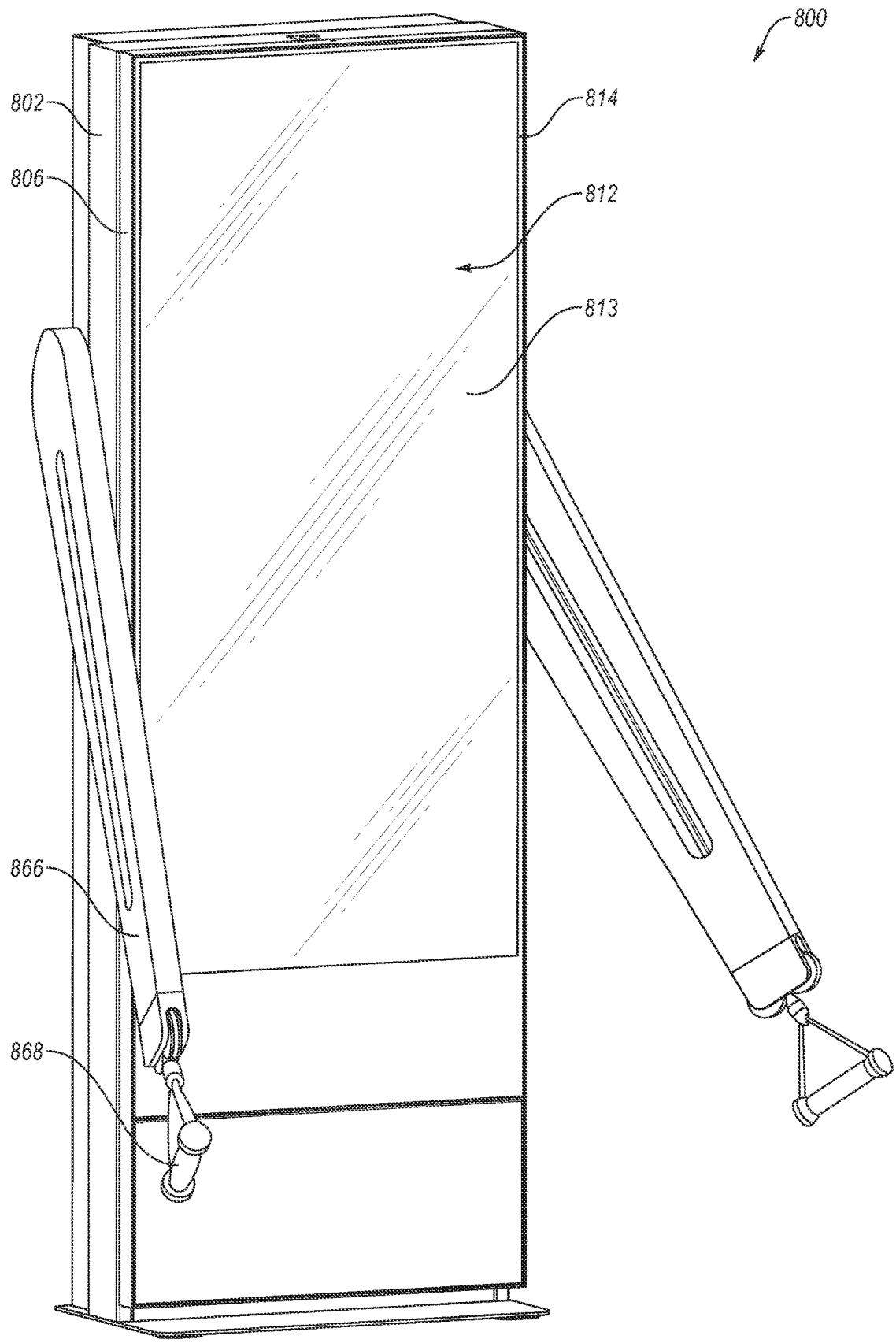
FIG. 9 is still another representation of an exercise storage system, according to at least one embodiment of the present disclosure.

FIG. 9 is a representation of an exercise storage device 800, according to at least one embodiment of the present disclosure. The exercise storage device 800 includes two resistance arms 866. When the door 806 is closed, the user may extend one or both of the resistance arms 866 and perform resistance based exercises. For example, the user may pull on the handles 868, which may be connected to a flywheel within the storage compartment 802. The resistance arms 866 may be rotatable with respect to the storage compartment 802. For example, the resistance arms 866 may be rotated into a storage position, in which the resistance arms 866 are parallel or substantially parallel to the storage compartment. The resistance arms may be further rotatable into different extended positions, which may allow the user to exercise different muscles and muscle groups. Resistance arms and flywheels consistent with the present disclosure are described in U.S. Pat. Nos. 10,188,890 and 10,279,212, the entireties of which are incorporated herein by reference.

The display 812 includes a backlit display 814 that is located behind a mirrored surface 813. The backlit display 814 may display an exercise program. The exercise program may include many exercises, including exercises that may use the resistance arms. The backlit display 814 may further include input features, in which the user may select an exercise program, change a resistance level of the resistance arms 866, and otherwise interact with the exercise program.

The backlit display 814 may display any information, including instructions on how to perform an exercise, videos of a trainer or other user performing the exercise, performance statistics, including calories burned, repetitions performed, and so forth, and combinations of the foregoing.

INDUSTRIAL APPLICABILITY

This disclosure generally relates to devices, systems, and methods for exercise storage systems. In some embodiments, an exercise storage system includes a storage compartment. In some embodiments, the storage compartment may include exercise equipment. The exercise equipment may include any piece of exercise equipment. For example, the exercise equipment may include an exercise machine, such as a treadmill, a stationary bicycle, an elliptical machine, a rowing machine, or any other exercise machine. In some embodiments, the exercise machine may include a collapsible or foldable exercise machine, and the exercise machine may fold into the storage compartment. In this manner, the storage container may be unobtrusive and/or attractive compact storage for the exercise machine.

As discussed above, the exercise machine may include a collapsible or a foldable treadmill. In some embodiments, the foldable treadmill may include a front end connected to a cable. A support on the cabinet may be connected to a spool connected to the cable. A motor may cause the spool to wind. This may cause the cable to lift the front end of the treadmill deck. In some embodiments, the deck may be lifted while exercising, causing an increase in the incline experienced by the user. In some embodiments, the deck may be lifted into a storage position inside the storage container. In some embodiments, the treadmill (or any exercise machine) may be completely stored within the storage container. In other words, a door of the exercise container may completely close an opening of the storage container, fully containing and removing the treadmill from view.

The storage compartment may include one or more storage elements, such as shelves, hooks, and so forth, on which exercise equipment may be placed. Any exercise equipment may be placed on the storage elements, such as weights, barbells, kettle balls, resistance bands, jump ropes, mats, gloves, clothes, shoes, any other exercise equipment, and combinations thereof.

The cabinet may include a door. The door may close over an opening in the cabinet. The opening in the cabinet may open to the storage features. Thus, when closed, the door may block access to the storage equipment. In some embodiments, the door may include an inner face and an outer face. The inner face may be the face of the door that faces the opening when the door is closed, and the outer face may be the face of the door that faces outward when the door is closed.

In some embodiments, the outer face of the door may include a display. The display may include a mirrored surface. The mirrored surface may allow a user to view himself while exercising. This may allow the user to examiner his form while exercising. In this manner, the user may critique and correct his form for exercises, which may help reduce injury, improve muscle strength, improve flexibility, and combinations thereof. Furthermore, because the mirrored surface is located on the door, it is conveniently located near the exercise equipment. This may allow the user to transition between exercises quickly and smoothly, without wasting time by walking from the cabinet to a mirror or exercise station.

In some embodiments, the display may include a backlit display, such as a monitor, a television, or other backlit display. When lit, the backlit display may be visible through the mirrored surface. The backlit display may present one or more exercise programs through the mirrored surface. The user may follow instructions on the exercise program to perform an exercise. In some embodiments, the exercise program may include instructions regarding the performance of exercises, including exercises using the exercise equipment stored in the cabinet.

In some embodiments, the backlit display may include a touchscreen display. For example, the user may be able to interact with the backlit display by touching the display. The user may provide input to the backlit display, respond to queries and other input from the backlit display, and otherwise interact with the backlit display. In this manner, the user may not need to keep track of a remote or install an application on a mobile device to interact with the display and/or the exercise program shown on the display.

In some embodiments, the display may include a one-way mirror. In other words, the display may include the mirrored surface and a backlit display. The backlit display may be visible through the mirrored surface, and the mirrored surface may still be mirrored. In this manner, the user may view herself on the mirrored surface and view the backlit display. Thus, the user may perform the exercises as instructed by the exercise program, and compare her execution of the exercises to the performance shown on the exercise program. This may improve the user experience, improve the user's exercise form, and allow the user to more effectively perform exercises.

In some embodiments, the door may be connected to the cabinet body with a hinge. The hinge may allow the outer face of the door to maintain an adjustable viewing angle. For example, the user may desire for the display on the outer face of the door to face the user, even when the door opens. Conventional hinges change the viewing angle of the door by angling the outer face of the door away from the storage compartment when opening. A hinge according to embodiments of the present disclosure may allow the outer face of the door to face the user, even as the door is opened. This may allow the user to access the exercise equipment while facing the display (e.g., the mirrored surface and the backlit display).

In some embodiments, the hinge may be connected to a first side of the cabinet body with a rotating connection. The hinge may rotate with a first axis of rotation at the first side of the cabinet body. In some embodiments, the hinge may be connected to the inner face of the door with a rotating connection. In some embodiments, the hinge may be connected to the inner face of the door at a middle position of the door. In other words, the hinge may be connected to the door at a position between a first edge and a second edge of the door. The hinge may rotate about a second axis of rotation at the connection to the inner face of the door.

In some embodiments, the door may be opened by rotating the hinge about the first axis of rotation. This may move the door away from the opening of the cabinet. The viewing angle of the display may be adjusted by rotating the hinge about the second axis of rotation. This may change the orientation of the door relative to the user. Thus, the user may orient the door according to her needs and preferences.

In some embodiments, the door may open such that the outer face is facing the same direction as the opening. In other words, the outer face may be parallel to the opening when in an open position, and the outer face may remain pointed in the same direction as in a closed position. As discussed above, this may allow the user to face the display and easily access exercise equipment from the opening, without significantly changing position.

In some embodiments, in the closed position, the door may latch to the storage compartment at an upper portion of the storage compartment. In some embodiments, the door may latch to the storage compartment at a second side of the storage compartment.

In some embodiments, the hinge may include a first lateral member and a second lateral member. The first lateral member may be rotatably connected to the cabinet at the cabinet first wall and rotatably connected to the door at the inner face of the door. The second lateral member may be rotatably connected to the cabinet at the cabinet first wall and rotatably connected to the door at the inner face of the door. A wall shaft may connect the first lateral member and the second lateral member at the cabinet wall. A door shaft may connect the first lateral member and the second lateral member at the door. In some embodiments, the wall shaft may be rotatably connected to the cabinet wall, and the door shaft may be rotatably connected to the door. In this manner, the hinge may be strong and support a heavy door. In some embodiments, the hinge may include any number of lateral members, such as 1, 2, 3, 4, 5, 6, 7, 8, or more lateral members.

In some embodiments, the door shaft may be movable along the width of the inner face of the door. For example, the door shaft may be slidably mounted on a rail. Thus, the position of the door may be adjustable based on the position of the door shaft. In at least one embodiment, this may allow the user to place the door closer to, further away from, and/or at a specific angle relative to the cabinet. In this manner, the user may arrange the door during an exercise activity based on personal preference, the activity performed, the space available, any other reason, and combinations thereof.

In some embodiments, when the door is open, the door may be moved such that, when the outer face of the door faces the same direction as the opening of the storage compartment, the display does not overlap any portion of the storage compartment. In this manner, the user may be access the exercise equipment inside the storage compartment without moving the door.

In some embodiments, the display may be mounted to the outer face of the door with an adjustable connection. For example, the display may be mounted to the outer face of the door with a sliding connection, and the display may have a vertically adjustable position. For example, the display may be slidably mounted on brackets, and the display may vertically move on the brackets. In at least one embodiment, a vertically adjustable display may allow the user to customize and/or optimally locate the display for use during an exercise activity. This may allow the user to place the display in a position with a better view and/or to view different portions of his body in the mirrored display during exercise activities. For example, when the user is performing a shoulder press with free weights, the user may wish to have the display located vertically higher to better view himself. In some examples, when the user is performing a yoga move while sitting down, crouching, or resting a portion of his weight on his hands, the user may wish to have the display located vertically lower to better view himself. In some examples, different users may have different heights; a taller user may place the display at a higher position than a shorter user.

In some embodiments, the vertical position of the display may be manually adjustable. In other words, the vertical position of the display may be changed by an application of an upward or a downward force by the user. In some embodiments, a motor may change the vertical position of the display. For example, a worm gear, linear motor, hydraulic piston, pneumatic piston, or other electronic and/or electromechanical system may change the vertical position of the display.

In some embodiments, a vertical angle of the display may be adjustable. For example, the display may be mounted to the door with a display hinge, and the display may be vertically rotated about the display hinge. In at least one embodiment, this may allow the user to change the display angle of the display. In this manner, the user may orient the display as desired. For example, the user may wish to orient the display downward to change the angle with which she may view herself performing an activity, and thereby observe and/or critique her form. Similarly, the user may wish to orient the display upward to better view the form of an elevated activity, such as pull-ups or other elevated activity.

In some embodiments, the vertical angle of the display may be manually adjustable. In other words, the vertical angle of the display may be changed by an application of a torque about the display hinge by the user. In some embodiments, a motor may change the vertical angle of the display. For example, a motor may rotate the display hinge. In some embodiments, the upper portion or the lower portion of the display may be moved linearly to change the display angle. For example, the upper portion of the display may be moved manually, or with a motor, such as a worm gear, linear motor, hydraulic piston, pneumatic piston, or other electronic and/or electromechanical system may change the vertical angle of the display.

In some embodiments, the display may further be configured with computer functionality to receive input from the user and provide output to the user, and/or configured to control the exercise machine. For example, the console may be employed in connection with motors to control the opening and closing of the door and the backlit display discussed above in order to allow the user to manually or programmatically alter the position of the display during the course of a workout on the exercise machine. The display may be configured to communicate over a network (e.g. a Bluetooth network, a WiFi network, or the Internet) with other similar exercise machines, with servers, with computing devices of personal trainers, and with sensors such as heart rate and respiration sensors, etc.

Furthermore, the display may be capable of downloading and uploading data in order to, for example, download and upload workouts, data gathered at the exercise storage system, and data gathered at other exercise machines, etc. The display may enable a user of the exercise machine to compete with a user of another similar or dissimilar exercise machine, that is local to or remote from the user, with the competing users competing in real-time or at different times. Further, the display may be configured to track the amount of repetitions performed by the user, the weight used, and other exercise data, during a workout in order to compute the number of calories burned, the amount of energy expended, the amount of work performed, or any other metric or statistic desired by the user. Further, the display may be configured to track the number of barbell lifts and weight lifted, the number of dumbbell lifts and weight lifted, and any other exercise performed in connection with the exercise machine in order to track the number of calories burned, the amount of energy expended, the amount of work performed, or any other metric or statistic desired by the user during a workout using the exercise machine.

In some embodiments, all data tracked or downloaded by the display may be presented to the user on the backlit display on a display of another device, such as a tablet or smartphone that is connected via Bluetooth with the console. Further, the display, or another device connected to the display, may be configured to guide a user through a workout using the exercise machine. This guidance may be audible guidance, visual guidance, or some combination of the two, including guidance that employs video depicting exactly what a user should do to follow the workout. In this manner, a user can have the benefit of a trainer without a human trainer present.

In some embodiments, the exercise storage system may provide guidance for a user. For example, the door may include a light projector. The light projector may be located behind the mirrored surface, and may project light, such as a laser or other light, onto a surface. The projected light may include lasers or other projected visual indicators to assist a user in performing a workout properly. For example, the projected light may be employed to show a user a location to place their feet, to show a user how far to step or jump, to show a user how to properly position their hips, knees, joints, head, shoulders, or any other body part to properly perform a cable or free weight exercise. In some embodiments, the location may include marks that are displayed on the surface. In some embodiments, the location may include a projection of the body part to be placed at that location.

Further, the console may be configured to function as a real-time live video interface to a human trainer who can guide a user through a workout on the exercise machine without the human trainer being present. Further, live or pre-recorded workout sessions may be displayed on the console, or another connected device, such as live studio sessions, powerlifting sessions, full-body sculpting sessions, and world-class coaching sessions. Further, the console may be configured such that a remote trainer, a live video feed, or a pre-recorded video feed or workout can control the resistance or other parameters of the exercise machine. Also, the display may be configured with multiple user profiles to store preferences and other settings for more than one user.

In some embodiments, an exercise storage device may include two resistance arms. When the door is closed, the user may extend one or both of the resistance arms and perform resistance based exercises. For example, the user may pull on the handles, which may be connected to a flywheel within the storage compartment. The resistance arms may be rotatable with respect to the storage compartment. For example, the resistance arms may be rotated into a storage position, in which the resistance arms are parallel or substantially parallel to the storage compartment. The resistance arms may be further rotatable into different extended positions, which may allow the user to exercise different muscles and muscle groups.

The display includes a backlit display that is located behind a mirrored surface. The backlit display may display an exercise program. The exercise program may include many exercises, including exercises that may use the resistance arms. The backlit display may further include input features, in which the user may select an exercise program, change a resistance level of the resistance arms, and otherwise interact with the exercise program. The backlit display may display any information, including instructions on how to perform an exercise, videos of a trainer or other user performing the exercise, performance statistics, including calories burned, repetitions performed, and so forth, and combinations of the foregoing.

Below are sections of the systems and methods of exercise storage systems of the present disclosure:

1. An exercise storage system, comprising:
    a storage compartment having a first side and a second side;
    a door;
    a display connected to the door, the display including a mirrored surface and a backlit display behind the mirrored surface; and
    a hinge connecting the storage compartment to the door, the hinge having a first axis of rotation at the first side of the storage compartment and a second axis of rotation at the door.
2. The exercise storage system of section 1, wherein the hinge is connected to the door at a position between a first end of the door and a second end of the door.
3. The exercise storage system of section 1 or section 2, wherein the display is connected to an outer face of the door.
4. The exercise storage system of any of sections 1-3, wherein the display has a vertically adjustable position.
5. The exercise storage system of section 4, wherein the display is connected to the door with a linear motor, and the display is vertically movable on the door with the linear motor.
6. The exercise storage system of any of sections 1-5, wherein a viewing angle of the display is adjustable.
7. The exercise storage system of any of sections 1-6, wherein the mirrored surface is a one-way mirror such that a reflection and the backlit display are both visible on the mirrored surface.
8. The exercise storage system of any of sections 1-7, wherein at least a portion of the display is a touchscreen display.
9. The exercise storage system of any of sections 1-8, wherein the storage compartment includes a plurality of storage features.
10. The exercise storage system of any of sections 1-9, wherein the door latches to an upper portion of the storage compartment.
11. The exercise storage system of any of sections 1-10, wherein in an open position, the display is parallel and faces the same direction as an opening of the storage compartment.
12. The exercise storage system of section 11, wherein in the open position, the display does not overlap any portion of the storage compartment.
13. The exercise storage system of any of sections 1-12, wherein the hinge includes a plurality of lateral members that extend between the first axis of rotation and the second axis of rotation.
14. A exercise storage system, comprising:
    a storage compartment;
    a door;
    a display connected to the door, the display including a mirrored surface; and
    a hinge connecting the door to the storage compartment, the hinge including:
        a first lateral member rotatably connected to a wall of the storage compartment and rotatably connected to the door; and
        a second lateral member rotatably connected to the wall of the storage compartment and rotatably connected to the door.

15. The exercise storage system of section 14, wherein the first lateral member is connected to the second lateral member by a wall shaft at the storage compartment.
16. The exercise storage system of section 15, wherein the wall shaft is rotatably connected to the wall of the storage compartment.
17. The exercise storage system of any of sections 14-16, wherein the second lateral member is connected to the second lateral member by a door shaft at the door.
18. The exercise storage system of section 17, wherein the door shaft is rotatably connected to the door.
19. The exercise storage system of any of sections 14-18, further comprising one or more resistance arms.
20. The exercise storage system of section 19, wherein the resistance arms are rotationally positionable relative to the storage compartment.
21. The exercise storage system of any of sections 14-20, further comprising an indicator light above an storage element in the storage compartment, the indicator light being configured to light up when a piece of exercise equipment is to be used.
22. A exercise storage system, comprising:
    a storage compartment having a first side, and a second side;
    a door;
    a display connected to the door with a sliding connection such that a vertical position of the display on the door is adjustable, wherein the display includes a mirrored surface; and
    a hinge connecting the storage compartment to the door, the hinge including
        a first lateral member rotatably connected with a wall shaft having a first axis of rotation to the first side of the storage compartment and rotatably connected with a door shaft to the door with a second axis of rotation; and
        a second lateral member rotatably connected with the wall shaft to the first side of the storage compartment and rotatably connected with the door shaft to the door.
23. The exercise storage system of section 22, wherein the mirrored surface is a one-way mirror such that a reflection and a backlit display are both visible on the mirrored surface.

What is claimed is:
1. An exercise storage system, comprising:
    a storage compartment having a first side and a second side;
    a door;
    a display connected to the door, the display including a mirrored surface and a backlit display behind the mirrored surface; and
    a hinge connecting the storage compartment to the door, the hinge including:
        a first lateral member rotatably connected with a wall shaft having a first axis of rotation at the first side of the storage compartment and rotatably connected with a door shaft to the door with a second axis of rotation at the door; and
        a second lateral member rotatably connected with the wall shaft to the first side of the storage compartment and rotatably connected with the door shaft to the door.
2. The exercise storage system of claim 1, wherein the hinge is connected to the door at a position between a first end of the door and a second end of the door.
3. The exercise storage system of claim 1, wherein the display is connected to an outer face of the door.
4. The exercise storage system of claim 1, wherein the display has a vertically adjustable position.
5. The exercise storage system of claim 4, wherein the display is connected to the door with a linear motor, and the display is vertically movable on the door with the linear motor.
6. The exercise storage system of claim 1, wherein a viewing angle of the display is adjustable.
7. The exercise storage system of claim 1, wherein the mirrored surface is a one-way mirror such that a reflection and the backlit display are both visible on the mirrored surface.
8. The exercise storage system of claim 1, wherein at least a portion of the display is a touchscreen display.
9. The exercise storage system of claim 1, wherein the storage compartment includes a plurality of storage features.
10. The exercise storage system of claim 1, wherein the door latches to an upper portion of the storage compartment.
11. The exercise storage system of claim 1, wherein in an open position, the display is parallel and faces the same direction as an opening of the storage compartment.
12. The exercise storage system of claim 11, wherein in the open position, the display does not overlap any portion of the storage compartment.
13. The exercise storage system of claim 1, wherein the hinge includes a plurality of lateral members that extend between the first axis of rotation and the second axis of rotation.
14. An exercise storage system, comprising:
    a storage compartment;
    a door;
    a display connected to the door, the display including a mirrored surface; and
    a hinge connecting the door to the storage compartment, the hinge including:
        a first lateral member rotatably connected to a wall of the storage compartment with a wall shaft having a first axis of rotation at the wall shaft and rotatably connected to the door with a door shaft having a second axis of rotation; and
        a second lateral member rotatably connected to the wall shaft and the door shaft.
15. The exercise storage system of claim 14, wherein the first lateral member is connected to the second lateral member by a wall shaft at the storage compartment.
16. The exercise storage system of claim 15, wherein the wall shaft is rotatably connected to the wall of the storage compartment.
17. The exercise storage system of claim 14, wherein the second lateral member is connected to the second lateral member by a door shaft at the door.
18. The exercise storage system of claim 17, wherein the door shaft is rotatably connected to the door.
19. An exercise storage system, comprising:
    a storage compartment having a first side, and a second side;
    a door;
    a display connected to the door with a sliding connection such that a vertical position of the display on the door is adjustable, wherein the display includes a mirrored surface; and
    a hinge connecting the storage compartment to the door, the hinge including
        a first lateral member rotatably connected with a wall shaft having a first axis of rotation to the first side of the storage compartment and rotatably connected with a door shaft to the door with a second axis of rotation; and a second lateral member rotatably connected with the wall shaft to the first side of the storage compartment and rotatably connected with the door shaft to the door.

20. The exercise storage system of claim 19, wherein the mirrored surface is a one-way mirror such that a reflection and a backlit display are both visible on the mirrored surface.

\* \* \* \* \*